United States Patent
Liu

(10) Patent No.: US 12,214,660 B2
(45) Date of Patent: Feb. 4, 2025

(54) DEVICE AND METHOD FOR PREVENTING MISTAKENLY STEPPING ON AN ACCELERATOR BY CONVERTING ACCELERATION INTO BRAKING

(71) Applicant: Zhiguang Liu, Hunan (CN)

(72) Inventor: Zhiguang Liu, Hunan (CN)

( * ) Notice: Subject to any disclaimer, the term of this patent is extended or adjusted under 35 U.S.C. 154(b) by 17 days.

(21) Appl. No.: 17/928,203

(22) PCT Filed: Aug. 2, 2021

(86) PCT No.: PCT/CN2021/110000
§ 371 (c)(1),
(2) Date: Nov. 28, 2022

(87) PCT Pub. No.: WO2022/028355
PCT Pub. Date: Feb. 10, 2022

(65) Prior Publication Data
US 2023/0249547 A1 Aug. 10, 2023

(30) Foreign Application Priority Data

Aug. 4, 2020 (CN) .......................... 202010770598.8

(51) Int. Cl.
*B60K 26/02* (2006.01)
*B60K 26/04* (2006.01)
*B60K 28/02* (2006.01)
*B60T 7/12* (2006.01)

(52) U.S. Cl.
CPC .............. *B60K 28/02* (2013.01); *B60K 26/02* (2013.01); *B60K 26/04* (2013.01); *B60T 7/12* (2013.01); *B60K 2026/043* (2013.01)

(58) Field of Classification Search
CPC .. B60K 26/02; B60K 26/04; B60K 2026/043; B60K 28/02; B60T 7/12
See application file for complete search history.

(56) References Cited

U.S. PATENT DOCUMENTS

2007/0068321 A1* 3/2007 Song ..................... G05G 1/405
74/512

FOREIGN PATENT DOCUMENTS

| CN | 2229893 Y | * | 6/1996 | |
|---|---|---|---|---|
| CN | 102225691 A | | 10/2011 | |
| CN | 106274484 A | | 1/2017 | |
| CN | 109591884 A | * | 4/2019 | ............. B60K 20/00 |
| CN | 110171294 A | | 8/2019 | |

(Continued)

*Primary Examiner* — Jason D Shanske
*Assistant Examiner* — Daniel M. Keck

(57) ABSTRACT

The present application provides a device and a method for preventing mistakenly stepping on an accelerator by converting acceleration into braking. The device comprises an accelerator push rod mechanism, a current switch, an outer housing, a worm gear & worm mechanism and an inner housing. The accelerator push rod mechanism comprises an upper push rod, a middle push rod and a lower push rod. The current switch is provided between the middle push rod and the outer housing. A worm gear is mounted on the inner housing; a worm is mounted in the inner housing, and the upper part of the worm is provided with a centrifugal disc; a pair of pawl & iron interlocks is hinged to the centrifugal disc. The middle push rod is mounted in an axial through hole of the worm, and the outer edge of the middle push rod is provided with a ratchet wheel.

10 Claims, 14 Drawing Sheets

(56) References Cited

FOREIGN PATENT DOCUMENTS

Figure 1:
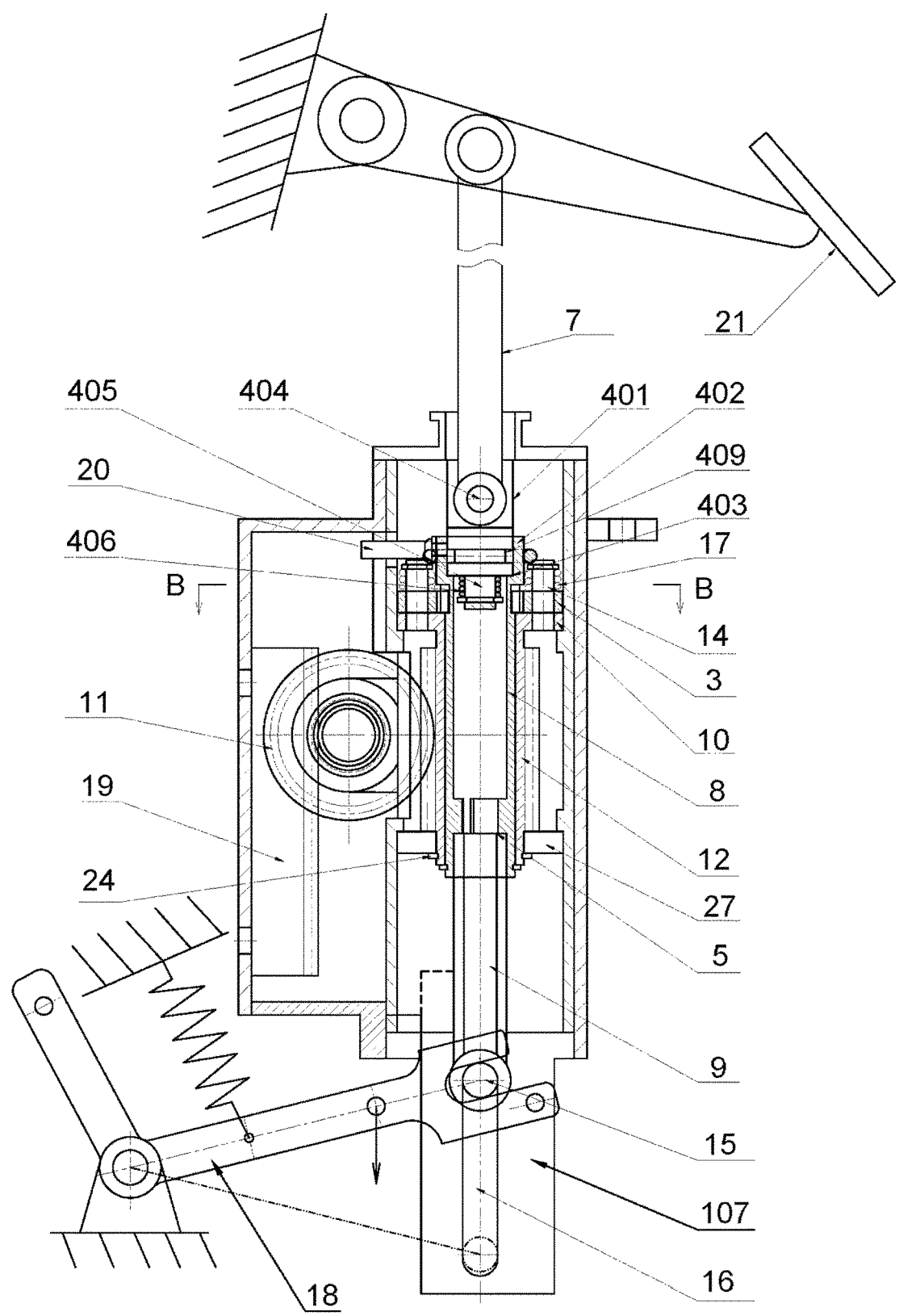

| | | | |
|---|---|---|---|
| CN | 111806228 A | 10/2020 | |
| CN | 112092616 A | * 12/2020 | ............ B60K 26/02 |
| DE | 2339529 A1 | 2/1975 | |
| JP | 2003146106 A | 5/2003 | |

* cited by examiner

DEVICE AND METHOD FOR PREVENTING MISTAKENLY STEPPING ON AN ACCELERATOR BY CONVERTING ACCELERATION INTO BRAKING

1. TECHNICAL FIELD

The present invention relates to the technical field of automobile safety, specifically to a device and a method for preventing mistakenly stepping on an accelerator by converting acceleration into braking.

2. BACKGROUND ART

As China follows the developed countries in the world to quickly enter the auto society, both the ownership of automobiles and the number of new drivers in China have increased sharply, and the traffic accident rate in China is also becoming higher and higher. When an old driver is under mental stress or fatigue or encounters an emergency, there's no guarantee that he/she will not mistakenly step on the accelerator instead of the brake, let alone a new driver, who is more likely to be nervous due to his/her unskilled driving and thus mistakenly step on the accelerator instead of the brake in an emergency, so that the vehicle accelerates rapidly. Once this happens, it is very easy to cause a serious and malignant traffic accident. Therefore, some vehicle manufacturers and concerned people are committed to research and development of safety protection devices for preventing mistakenly stepping on an accelerator. There have been many related papers and invention patents. At present, there are two main types of systems for preventing mistakenly stepping on an accelerator, namely mechanical and electronic. Mechanical systems for preventing mistakenly stepping on an accelerator generally make great changes to the internal structures of accelerator and brake pedals and make changes to the current operation interfaces, and thus need to change the fixed operation behaviors of drivers and change their feet's normal feeling of stepping on the accelerator and the brake, with a certain impact on their formed driving habits, so it is difficult for people to adapt to them; their universalities are poor; their costs are low and their structures are simple, but their reaction sensitivities are insufficient and their discrimination accuracies need to be improved; some of them first execute acceleration and then execute braking, so that stopping distance is greatly increased and vehicles stop only after accidents happen, less safe, less mature, and difficult to be widely applied to vehicles. Electronic systems for preventing mistakenly stepping on an accelerator make less modifications to the original vehicle structures, but the reliability required for such systems is high; these systems are complex, and the acquisition accuracy required for sensor is significantly high; electrical devices have many contact points, so it is prone to cause bad contact, with poor reliability; intelligent control mode requires high reliability for single-chip systems, and there is a problem of response lag (when these systems discriminate drivers' mistakenly stepping on accelerators, accelerators have been thoroughly stepped on; although emergency braking is finally achieved, braking distance is very long, and vehicles stop only after accidents happen); their manufacturing costs are high, not conducive to practical application of numerous such products to vehicles. It is difficult to recognize the overlap area between the condition of urgent acceleration for overtaking and the condition of emergency braking. As a result, drivers originally wanted to accelerate for overtaking but finally implemented braking.

3. SUMMARY OF THE INVENTION

The purpose of the present invention is to provide a device and a method for preventing mistakenly stepping on an accelerator by converting acceleration into braking, which make minimal change to the original vehicle structure, comply with the traditional driving habits and achieve good reliability.

The present invention adopts the following technical proposal to accomplish its purpose: a device for preventing mistakenly stepping on an accelerator by converting acceleration into braking, comprising an accelerator push rod mechanism connected to an accelerator pedal and a current switch making current to a braking actuator, also comprising an outer housing in which a worm gear & worm mechanism composed of a worm and a worm gear is mounted to drive an inner housing that can only move axially; the worm is mounted in the inner housing by axial limiting, and the worm gear is mounted on the inner housing; a rack coordinating with the worm gear through a pinion coupled with the worm gear is fixedly mounted on the outer housing; the accelerator push rod mechanism comprises an upper push rod, a middle push rod and a lower push rod; the upper part of the worm is provided with a centrifugal disc; a pair of pawl & iron interlocks is hinged to the centrifugal disc through a vertical shaft; a return torsion spring is provided between a pawl & iron interlock and the centrifugal disc; an axial through hole is arranged at the worm's axis center connected to the centrifugal disc; the middle push rod is mounted in the axial through hole by axial limiting; the central hole is arranged at the axis center of the middle push rod; the outer edge of the middle push rod is provided with a ratchet wheel that can correspondingly coordinate with pawls; the upper part of the middle push rod is connected to one end of the upper push rod through a push rod linkage; the other end of the upper push rod is connected to the accelerator pedal by radial limiting; the lower part of the middle push rod is connected to the upper part of the lower push rod through the push rod connecting mechanism; the lower push rod is connected to a slide integrated with the bottom of the outer housing through a sliding shaft that fixes the bottom of the lower push rod by radial limiting; the lower push rod is also connected to an accelerator cable; the current switch making current to the braking actuator by the middle push rod's rotating is provided between the middle push rod and the outer housing;

When stepping on the accelerator during normal driving or for overtaking, the stepping force & speed and acceleration cannot trigger jointing of pawls and the ratchet wheel, and the downward force on the upper push rod is transferred to the inner housing and the lower push rod through the middle push rod and the worm gear & worm mechanism for going down together, so that the lower push rod's going down drives an accelerator cable to adjust accelerator opening; when mistakenly stepping on the accelerator in an emergency, the stepping force & speed and acceleration make the centrifugal disc connected to the worm rotate at a high speed, triggering the jointing of the pawls and the ratchet wheel so that the middle push rod is driven to rotate, further triggering the push rod connecting mechanism to operate so that the lower push rod first extends into the central hole of the middle push rod to release the accelerator, and then triggering the current switch's making current so that the braking actuator executes braking.

According to the present invention, the push rod connecting mechanism comprises a raised inner spline in the lower part of the central hole of the middle push rod; the inner spline divides the central hole of the middle push rod into a locating hole for the lower push rod and an ascending return accommodating hole for the lower push rod; the upper part of the lower push rod is mounted in the locating hole and provided with an outer spline that can coordinate with the inner spline; the width of inner spline grooves should be greater than that of outer spline keys, and the greater part is the rotation angle required for the middle push rod to trigger the current switch;

The sunken part of the inner spline is a pair of fan-shaped inner spline grooves that are arranged symmetrically; the raised part of the outer spline is a pair of long and narrow fan-shaped outer spline keys;

The push rod linkage comprises a rod head with a U-shaped notch arranged on the upper end and a splicing sleeve arranged on the upper part of the middle push rod for coordinating with the rod head; the inner diameter of the splicing sleeve on the middle push rod is greater than the diameter of the central hole, forming a retaining shoulder; the bottom of the rod head contacts with the face of the retaining shoulder; the lower end of the upper push rod is hinged in the U-shaped notch through a large hinge pin, and the upper end of the upper push rod is connected to the accelerator pedal by radial limiting; the bottom of the rod head is provided with a torsion spring mounting shaft coaxial with the rod head; the torsion spring mounting shaft is fitted with a middle push rod return torsion spring which prevents falling off through a shaft circlip; one end of the middle push rod return torsion spring is mounted at the bottom of the rod head, and the other end is mounted on the wall of the central hole of the middle push rod; two open slots are symmetrically arranged on both sides of the splicing sleeve; the rod head between the U-shaped notch and the torsion spring mounting shaft is provided with an external annular groove corresponding to the two open slots; there is an overlap after the two open slots coordinate with the external annular groove; the rod head is connected to the middle push rod at the overlap through a special-shaped snap ring; the inner of the external annular groove of the road head is provided with a stop block that enables the middle push rod to achieve a radial stop in conjunction with the special-shaped snap ring under the preload of the middle push rod return torsion spring; the stop block in the radial position of the external annular groove of the road head makes the inner spline grooves in the central hole of the middle push rod completely misaligned with the outer spline keys of the lower push rod in a normal state.

The current switch comprises a switch anode stator, which is insulated from the outer housing, and a switch cathode rotor, which is arranged on the upper part of the outer edge of the middle push rod, can coordinate with the switch anode stator for switching on and is used for making current to the braking actuator; the length of the switch anode stator is greater than the axial stroke of the middle push rod.

According to the present invention, the pawl & iron interlock is composed of an iron and a pawl; the pawl is provided with a mounting hole matched with the vertical shaft; the pawl is a 3~8 mm thick V-shaped claw; the end far away from the tip of the pawl is the iron unified with the pawl; the iron is a half-cut waist-shaped block protruding from the upper plane of the pawl; the thickness of the half-cut waist-shaped block is two to three times of the thickness of the pawl; the pawl achieves locating through a bumping post mounted on the centrifugal disc in a normal state.

A method for preventing mistakenly stepping on an accelerator by converting acceleration into braking makes use of the accelerator pedal stepping force & speed and acceleration to trigger the device for preventing mistakenly stepping on an accelerator by converting acceleration into braking, which comprises an accelerator push rod mechanism connected to an accelerator pedal and a current switch making current to a braking actuator, and also comprises an outer housing in which a worm gear & worm mechanism composed of a worm and a worm gear is mounted to drive an inner housing that can only move axially; the worm is mounted in the inner housing by axial limiting, and the worm gear is mounted on the inner housing; a rack coordinating with the worm gear through a pinion coupled with the worm gear is fixedly mounted on the outer housing; the accelerator push rod mechanism comprises an upper push rod, a middle push rod and a lower push rod; the upper part of the worm is provided with a centrifugal disc; a pair of pawl & iron interlocks is hinged to the centrifugal disc through a vertical shaft; a return torsion spring is provided between a pawl & iron interlock and the centrifugal disc; an axial through hole is arranged at the worm's axis center connected to the centrifugal disc; the middle push rod is mounted in the axial through hole by axial limiting; the central hole is arranged at the axis center of the middle push rod; the outer edge of the middle push rod is provided with a ratchet wheel that can correspondingly coordinate with pawls; the upper part of the middle push rod is connected to one end of the upper push rod through a push rod linkage; the other end of the upper push rod is connected to the accelerator pedal by radial limiting; the lower part of the middle push rod is connected to the upper part of the lower push rod through the push rod connecting mechanism; the lower push rod is connected to a slide integrated with the bottom of the outer housing through a sliding shaft that fixes the bottom of the lower push rod by radial limiting; the lower push rod is also connected to an accelerator cable; the current switch making current to the braking actuator by the middle push rod's rotating is provided between the middle push rod and the outer housing; when stepping on the accelerator during normal driving or for overtaking, the stepping force & speed and acceleration cannot trigger jointing of the pawls and the ratchet wheel, and the downward force on the upper push rod is transferred to the inner housing and the lower push rod through the middle push rod and the worm gear & worm mechanism for going down together, so that the lower push rod's going down drives an accelerator cable to adjust accelerator opening; when mistakenly stepping on the accelerator in an emergency, the stepping force & speed and acceleration make the centrifugal disc connected to the worm rotate at a high speed, triggering the jointing of the pawls and the ratchet wheel so that the middle push rod is driven to rotate, further triggering the push rod connecting mechanism to operate so that the lower push rod first extends into the central hole of the middle push rod to release the accelerator, and then triggering the current switch's making current so that the braking actuator executes braking.

A device for preventing mistakenly stepping on an accelerator by converting acceleration into braking comprises an accelerator push rod mechanism connected to an accelerator pedal and a current switch making current to a braking actuator, makes use of the accelerator pedal stepping force & speed and acceleration to trigger the conversion of acceleration into braking, and also comprises an outer housing in which a worm gear & worm mechanism composed of a worm and a worm gear is mounted to drive an inner housing that can only move axially; the worm is mounted in the inner housing by axial limiting, and the worm gear is mounted on the inner housing; a rack coordinating with the worm gear through a pinion coupled with the worm gear is fixedly mounted on the outer housing; the accelerator push rod mechanism comprises an upper push rod, a middle push rod and a lower push rod; the upper part of the worm is provided with a centrifugal disc; a pair of pawl & iron interlocks is hinged to the centrifugal disc through a vertical shaft; a return torsion spring is provided between a pawl & iron interlock and the centrifugal disc; an axial through hole is arranged at the worm's axis center connected to the centrifugal disc; the middle push rod is mounted in the axial through hole; an emergency locking mechanism, which makes the middle push rod to drive the worm to move, is provided between the axial through hole and the middle push rod; an urgent acceleration judging spring is provided between the outer housing and the lower part of the inner housing; the central hole is arranged at the axis center of the middle push rod; the outer edge of the middle push rod is provided with a long and narrow ratchet wheel that can correspondingly coordinate with pawls over the full stroke; the upper part of the middle push rod is connected to one end of the upper push rod through a push rod linkage; the other end of the upper push rod is connected to the accelerator pedal by radial limiting; the lower part of the middle push rod is connected to the upper part of the lower push rod through the push rod connecting mechanism; the lower push rod is connected to a slide integrated with the bottom of the outer housing through a sliding shaft that fixes the bottom of the lower push rod by radial limiting; the lower push rod is also connected to an accelerator cable; the current switch making current to the braking actuator by the middle push rod's rotating is provided between the middle push rod and the outer housing; when stepping on the accelerator during normal driving, the accelerator pedal stepping force & speed and acceleration will not trigger the emergency locking mechanism to operate, and the worm gear & worm mechanism will neither move nor rotate, so that the pawls will not achieve jointing with the long and narrow ratchet wheel, and due to the resistance from the urgent acceleration judging spring, only the upper push rod, the middle push rod and the lower push rod are linked to go down for adjusting the accelerator opening; when stepping on the accelerator during overtaking, there will be two situations according to the accelerator stepping force & speed and acceleration: the first situation—the emergency locking mechanism will still not operate, and the worm gear & worm mechanism will neither move nor rotate, so that the pawls will not achieve jointing with the long and narrow ratchet wheel, and only the upper push rod, the middle push rod and the lower push rod are linked to go down for adjusting the accelerator opening; the second situation—the emergency locking mechanism will operate, but the worm gear & worm mechanism will move and rotate at a low or medium speed, unable to trigger the jointing of the pawls and the long and narrow ratchet wheel, and the downward force on the upper push rod is transferred to the inner housing and the lower push rod through the middle push rod and the worm gear & worm mechanism for going down together by overcoming the resistance from the urgent acceleration judging spring, so as to adjust the accelerator opening; when mistakenly stepping on the accelerator in an emergency, the accelerator pedal stepping force & speed and acceleration trigger the emergency locking mechanism to operate, and the downward force on the upper push rod is transferred to the inner housing through the middle push rod and the worm gear & worm mechanism for going down by overcoming the resistance from the urgent acceleration judging spring, so that the centrifugal disc connected to the worm rotates at a high speed, triggering the jointing of the pawls and the long and narrow ratchet wheel to drive the middle push rod to rotate, further triggering the push rod connecting mechanism to operate so that the lower push rod first extends into the central hole of the middle push rod to release the accelerator, and then triggering the current switch's making current so that the braking actuator executes braking.

According to the present invention, the push rod connecting mechanism comprises a raised inner spline in the lower part of the central hole of the middle push rod; the inner spline divides the central hole of the middle push rod into a locating hole for the lower push rod and an ascending return accommodating hole for the lower push rod; the upper part of the lower push rod is mounted in the locating hole and provided with an outer spline that can coordinate with the inner spline; the width of inner spline grooves should be greater than that of outer spline keys, and the greater part is the rotation angle required for the middle push rod to trigger the current switch;

The sunken part of the inner spline is a pair of fan-shaped inner spline grooves that are arranged symmetrically; the raised part of the outer spline is a pair of long and narrow fan-shaped outer spline keys;

According to the present invention, the push rod linkage comprises a rod head with a U-shaped notch arranged on the upper end and a splicing sleeve arranged on the upper part of the middle push rod for coordinating with the rod head; the inner diameter of the splicing sleeve on the middle push rod is greater than the diameter of the central hole, forming a retaining shoulder; the bottom of the rod head contacts with the face of the retaining shoulder; the lower end of the upper push rod is hinged in the U-shaped notch through a large hinge pin, and the upper end of the upper push rod is connected to the accelerator pedal by radial limiting; the bottom of the rod head is provided with a torsion spring mounting shaft coaxial with the rod head; the torsion spring mounting shaft is fitted with a middle push rod return torsion spring which prevents falling off through a shaft circlip; one end of the middle push rod return torsion spring is mounted at the bottom of the rod head, and the other end is mounted on the wall of the central hole of the middle push rod; an internal annular groove is arranged on the inner wall of the splicing sleeve; a technological notch connected to the internal annular groove for mounting the rod head is also arranged on the inner wall of the splicing sleeve; a through hole parallel to the U-shaped notch is arranged on the rod head between the U-shaped notch and the torsion spring mounting shaft; a small hinge pin coordinating with the internal annular groove in the splicing sleeve is mounted in the through hole; the rod head is connected to the middle push rod through the small hinge pin; the inner of the internal annular groove of the middle push rod is provided with a stop pin that enables the middle push rod to achieve a radial stop in conjunction with the small hinge pin on the rod head under the preload of the middle push rod return torsion spring; the stop pin in the radial position of the internal annular groove of the splicing sleeve of the middle push rod makes the inner spline grooves in the central hole of the middle push rod completely misaligned with the outer spline keys of the lower push rod in a normal state. Other form of current switch closing by an actuating arm is provided on the middle push rod.

The current switch comprises a switch anode stator, which is insulated from the outer housing, and a switch cathode rotor, which is arranged on the upper part of the outer edge of the middle push rod, can coordinate with the switch anode stator for switching on and is used for making current to the braking actuator; the length of the switch anode stator is greater than the axial stroke of the middle push rod.

According to the present invention, for recognition of normally stepping on the accelerator, urgently stepping on the accelerator for overtaking and mistakenly stepping on the accelerator, the emergency locking mechanism comprises circular arc ring grooves arranged uniformly on the wall of the axial through hole of the worm along the axial direction and U-shaped recesses arranged uniformly in the middle part of the outer edge of the middle push rod along the radial direction for coordinating with the circular arc ring grooves, and vertical U shapes are under oblique U shapes on the U-shaped recesses in which steel balls are mounted.

According to the present invention, the upper part of the outer housing is a whole-circle pipe; the upper part of the whole-circle pipe is provided with an outer housing notch required for not hindering the full-stroke movement and rotation of the switch cathode rotor on the middle push rod; the middle part of the outer housing is a semicircle pipe; the radius of the lower part of the semicircle pipe is greater than that of upper part of the semicircle pipe for mounting the urgent acceleration judging spring; the lower end of the semicircle pipe is provided with a fixed large semicircle tile; the opposite side of the fixed large semicircle tile is provided with a removable small semicircle tile; the inner diameter of the fixed large semicircle tile and that of the removable small semicircle tile are the same as that of the whole-circle pipe; the outer diameter of the fixed large semicircle tile and that of the removable small semicircle tile are the same as that of the semicircle pipe in the middle part; when mounting the inner housing, two external shaft seats for mounting the worm gear on the inner housing should be able to get through the small semicircle notch opposite to the large semicircle tile; there are two symmetric sliding shaft supports in the lower part of the large semicircular tile; vertical slides are provided on the sliding shaft supports; one side of the whole-circle pipe and the semicircle pipe is provided with a protecting crust from both sides of the semicircle body; two rack mounting holes are arranged on the wall of the protecting crust of the semicircle pipe; two switch anode stator mounting holes are arranged on the crust wall on one side of the protecting crust opposite to the rotation direction of the switch cathode rotor; the above removable small semicircle tile is provided with a protective iron sheet; mounting lugs are arranged on both sides of the fixed large semicircle tile and the removable small semicircle tile; the whole-circle pipe and the protecting crust are provided with the outer housing mounting lugs;

The inner housing is a circular pipe body; the middle section of the inner wall of the circular pipe body is provided with two internal annular protruding shoulders for axial limiting of the worm; the middle section of the outer edge of the circular pipe body is provided with an external annular protruding shoulder for mounting the urgent acceleration judging spring, and both sides of the middle section of the outer edge of the circular pipe body are provided with two external shaft seats for mounting the worm gear; bearings are mounted in the external shaft seats; the pipe body between two shaft seats is provided with a rectangular notch required for the engaging of the worm gear and the worm; the upper part of the circular pipe body is provided with an inner housing notch required for not hindering the full-stroke movement and rotation of the switch cathode rotor on the middle push rod.

A method for preventing mistakenly stepping on an accelerator by converting acceleration into braking makes use of the accelerator pedal stepping force & speed and acceleration to trigger the device for preventing mistakenly stepping on an accelerator by converting acceleration into braking, which comprises an accelerator push rod mechanism connected to an accelerator pedal and a current switch making current to a braking actuator, and also comprises an outer housing in which a worm gear & worm mechanism composed of a worm and a worm gear is mounted to drive an inner housing that can only move axially; the worm is mounted in the inner housing by axial limiting, and the worm gear is mounted on the inner housing; a rack coordinating with the worm gear through a pinion coupled with the worm gear is fixedly mounted on the outer housing; the accelerator push rod mechanism comprises an upper push rod, a middle push rod and a lower push rod; the upper part of the worm is provided with a centrifugal disc; a pair of pawl & iron interlocks is hinged to the centrifugal disc through a vertical shaft; a return torsion spring is provided between a pawl & iron interlock and the centrifugal disc; an axial through hole is arranged at the worm's axis center connected to the centrifugal disc; the middle push rod is mounted in the axial through hole; an emergency locking mechanism, which makes the middle push rod to drive the worm to move, is provided between the axial through hole and the middle push rod; an urgent acceleration judging spring is provided between the outer housing and the lower part of the inner housing; the central hole is arranged at the axis center of the middle push rod; the outer edge of the middle push rod is provided with a long and narrow ratchet wheel that can correspondingly coordinate with pawls over the full stroke; the upper part of the middle push rod is connected to one end of the upper push rod through a push rod linkage; the other end of the upper push rod is connected to the accelerator pedal by radial limiting; the lower part of the middle push rod is connected to the upper part of the lower push rod through the push rod connecting mechanism; the lower push rod is connected to a slide integrated with the bottom of the outer housing through a sliding shaft that fixes the bottom of the lower push rod by radial limiting; the lower push rod is also connected to an accelerator cable; the current switch making current to the braking actuator by the middle push rod's rotating is provided between the middle push rod and the outer housing; when stepping on the accelerator during normal driving, the accelerator pedal stepping force & speed and acceleration will not trigger the emergency locking mechanism to operate, and the worm gear & worm mechanism will neither move nor rotate, so that the pawls will not achieve jointing with the long and narrow ratchet wheel, and due to the resistance from the urgent acceleration judging spring, only the upper push rod, the middle push rod and the lower push rod are linked to go down for adjusting the accelerator opening; when stepping on the accelerator during overtaking, there will be two situations according to the accelerator stepping force & speed and acceleration: the first situation—the emergency locking mechanism will still not operate, and the worm gear & worm mechanism will neither move nor rotate, so that the pawls will not achieve jointing with the long and narrow ratchet wheel, and only the upper push rod, the middle push rod and the lower push rod are linked to go down for adjusting the accelerator opening; the second situation—the emergency locking mechanism will operate, but the worm gear & worm mechanism will move and rotate at a low or medium speed, unable to trigger the jointing of the pawls and the long and narrow ratchet wheel, and the downward force on the upper push rod is transferred to the inner housing and the lower push rod through the middle push rod and the worm gear & worm mechanism for going down together by overcoming the resistance from the urgent acceleration judging spring, so as to adjust the accelerator opening; when mistakenly stepping on the accelerator in an emergency, the accelerator pedal stepping force & speed and acceleration trigger the emergency locking mechanism to operate, and the downward force on the upper push rod is transferred to the inner housing through the middle push rod and the worm gear & worm mechanism for going down by overcoming the resistance from the urgent acceleration judging spring, so that the centrifugal disc connected to the worm rotates at a high speed, triggering the jointing of the pawls and the long and narrow ratchet wheel to drive the middle push rod to rotate, further triggering the push rod connecting mechanism to operate so that the lower push rod first extends into the central hole of the middle push rod to release the accelerator, and then triggering the current switch's making current so that the braking actuator executes braking.

According to the present invention, the urgent acceleration judging spring is used to distinguish the stepping force & speed and acceleration when stepping on the accelerator during normal driving and that when stepping on the accelerator for overtaking; the urgent acceleration judging spring force, the worm gear & worm mechanism rotating ratio, the iron mass and the pawl return torsion spring torque are also used to distinguish the stepping force & speed and acceleration when urgently stepping on the accelerator for overtaking and that when mistakenly stepping on the accelerator for coarse acceleration, and after setting the urgent acceleration judging spring force, the worm gear & worm mechanism rotating ratio, the iron mass and the pawl return torsion spring torque, adopting the pedal stepping force & speed and acceleration dual triggering mode can ensure that the three working conditions have clear and large intervals which neither overlap nor disturb each other.

Owing to the above technical proposal, the present invention better accomplishes its purpose. The three working conditions have large recognition intervals which neither overlap nor disturb each other. The discrimination accuracy is high. When stepping on the accelerator for acceleration in an emergency, it can be instantaneously converted to first accelerator release and then emergency braking. When overtaking is needed or in other circumstance, normal driving can be implemented, without the problem of response lag of electronic systems. The stroke response time is short for the worm gear & worm mechanism and the pinion & rack mechanism. With strong commonality, suitable for all vehicles, the present invention can be widely applied to all types of vehicles, and can greatly improve the safety performance of vehicles, with an unexpected good technical effect on reduction of traffic accidents.

4. BRIEF DESCRIPTION OF ACCOMPANY DRAWINGS

Figure 2:
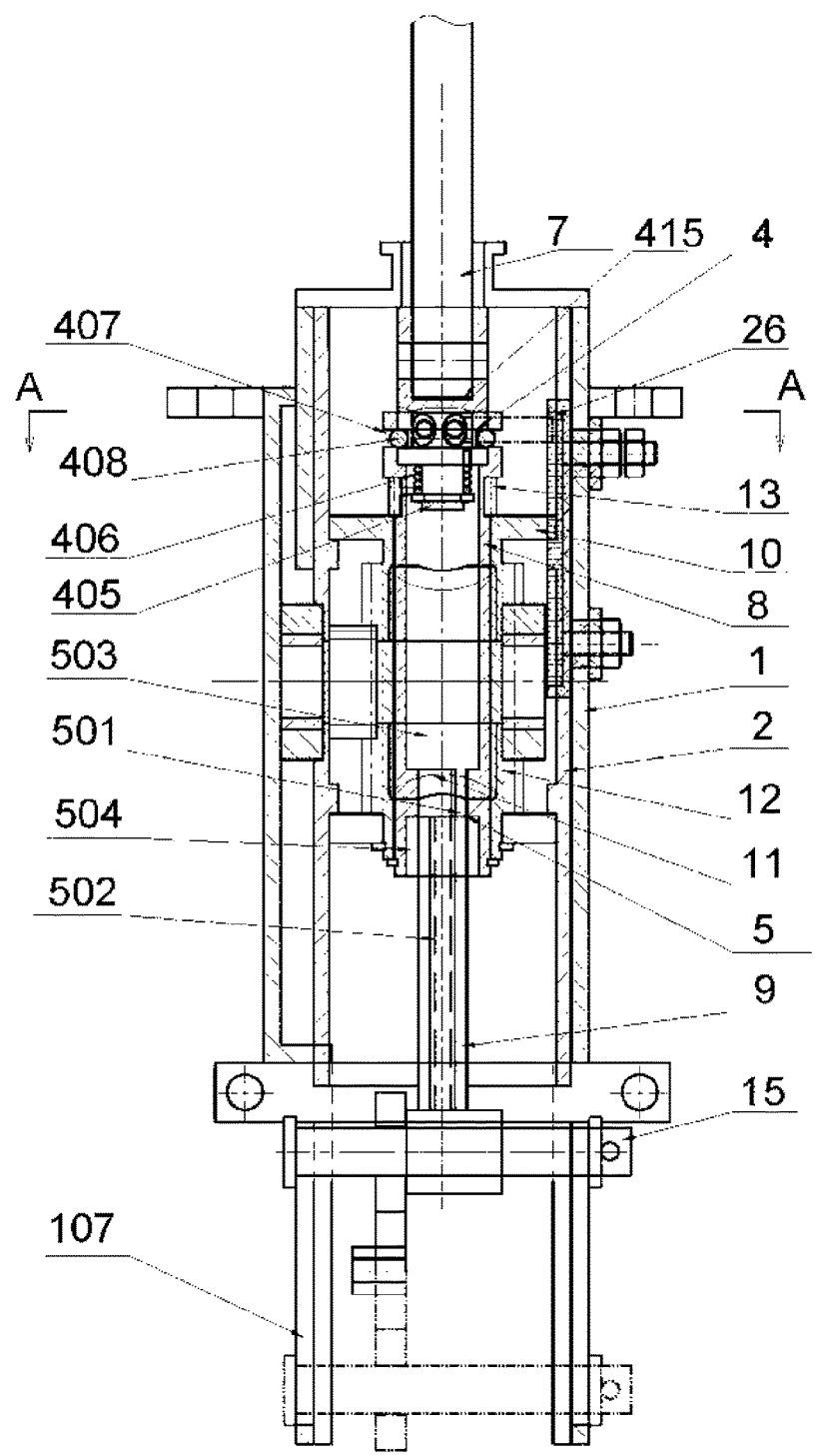
Figure 3:
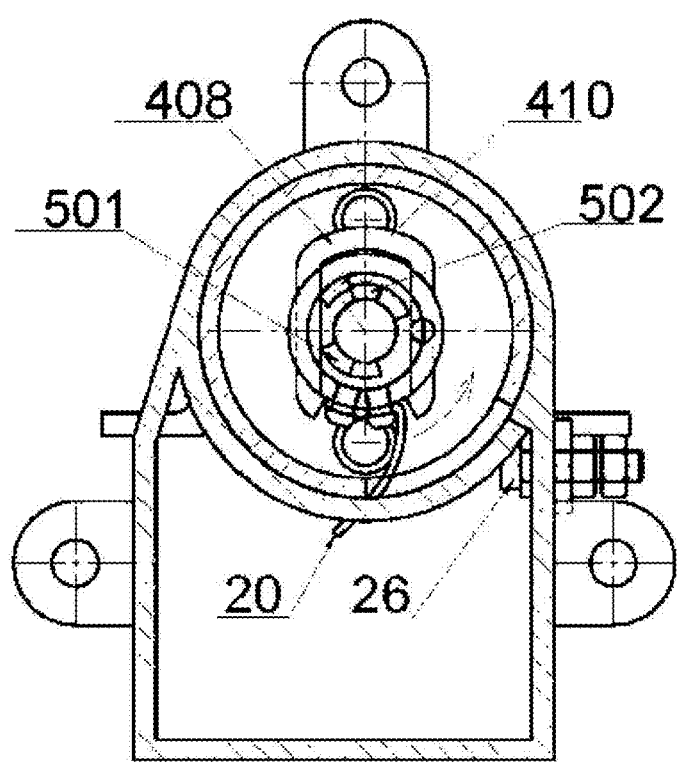
Figure 4:
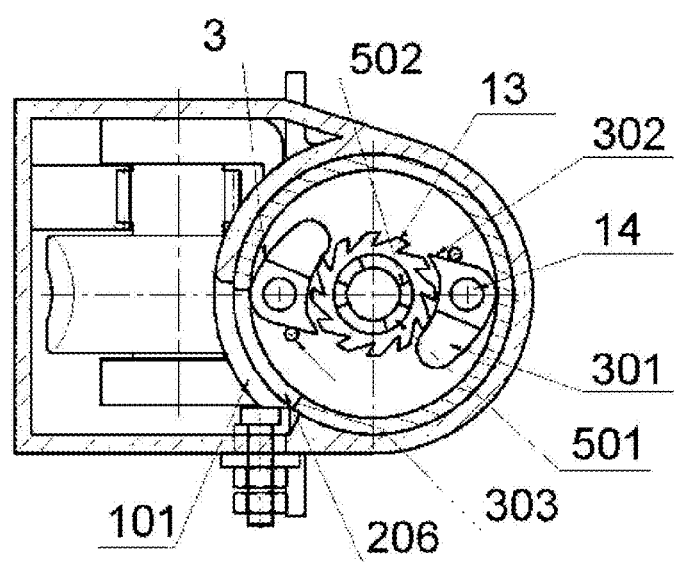
Figure 5:
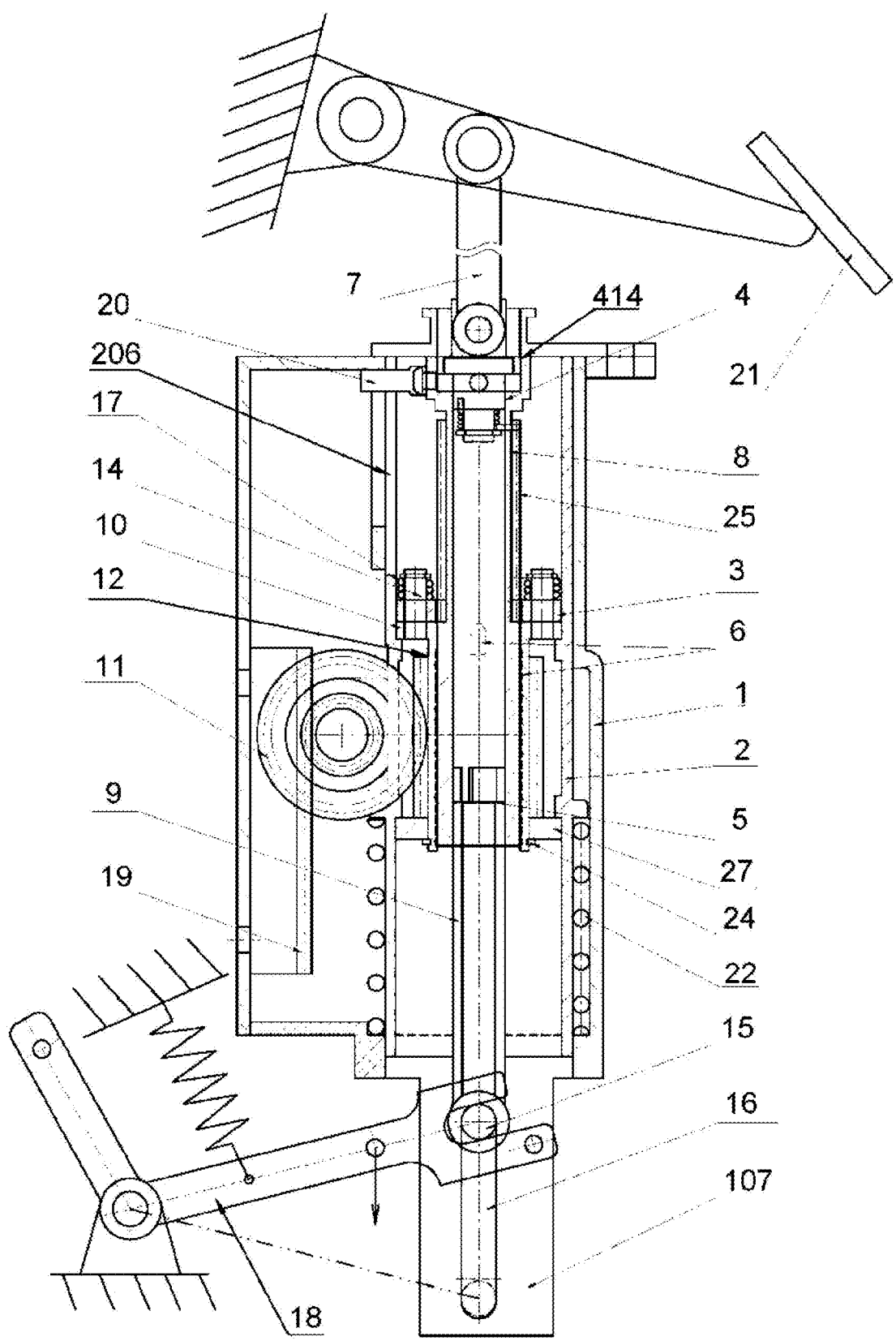
Figure 6:
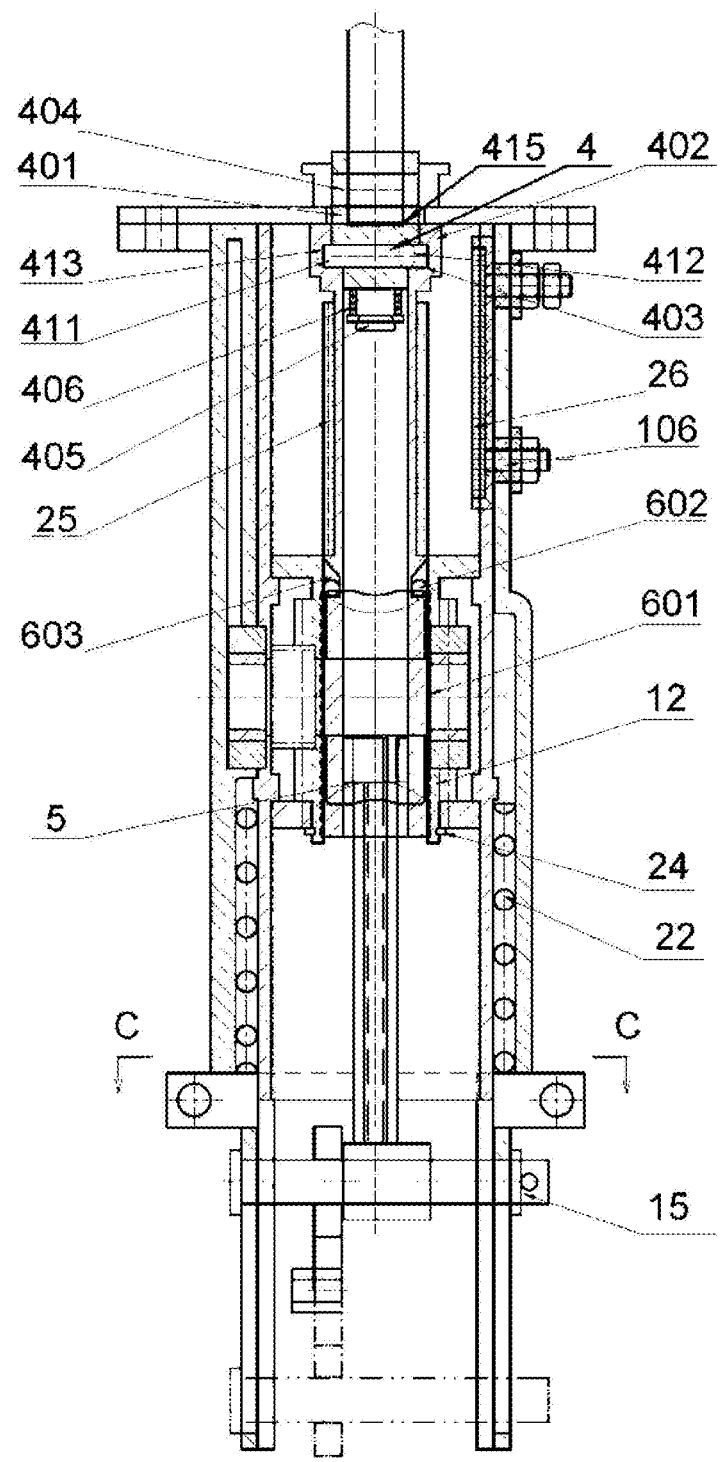
Figure 7:
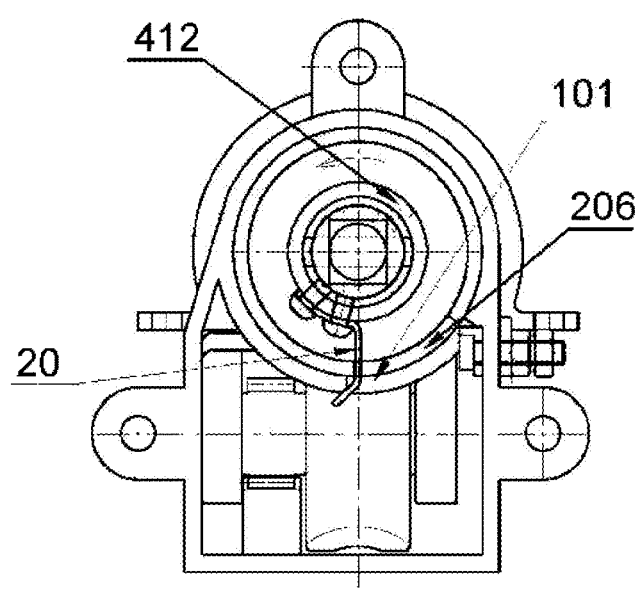
Figure 8:
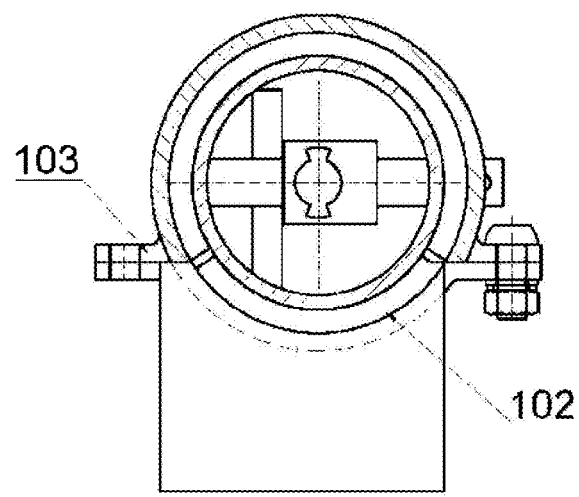
Figure 9:
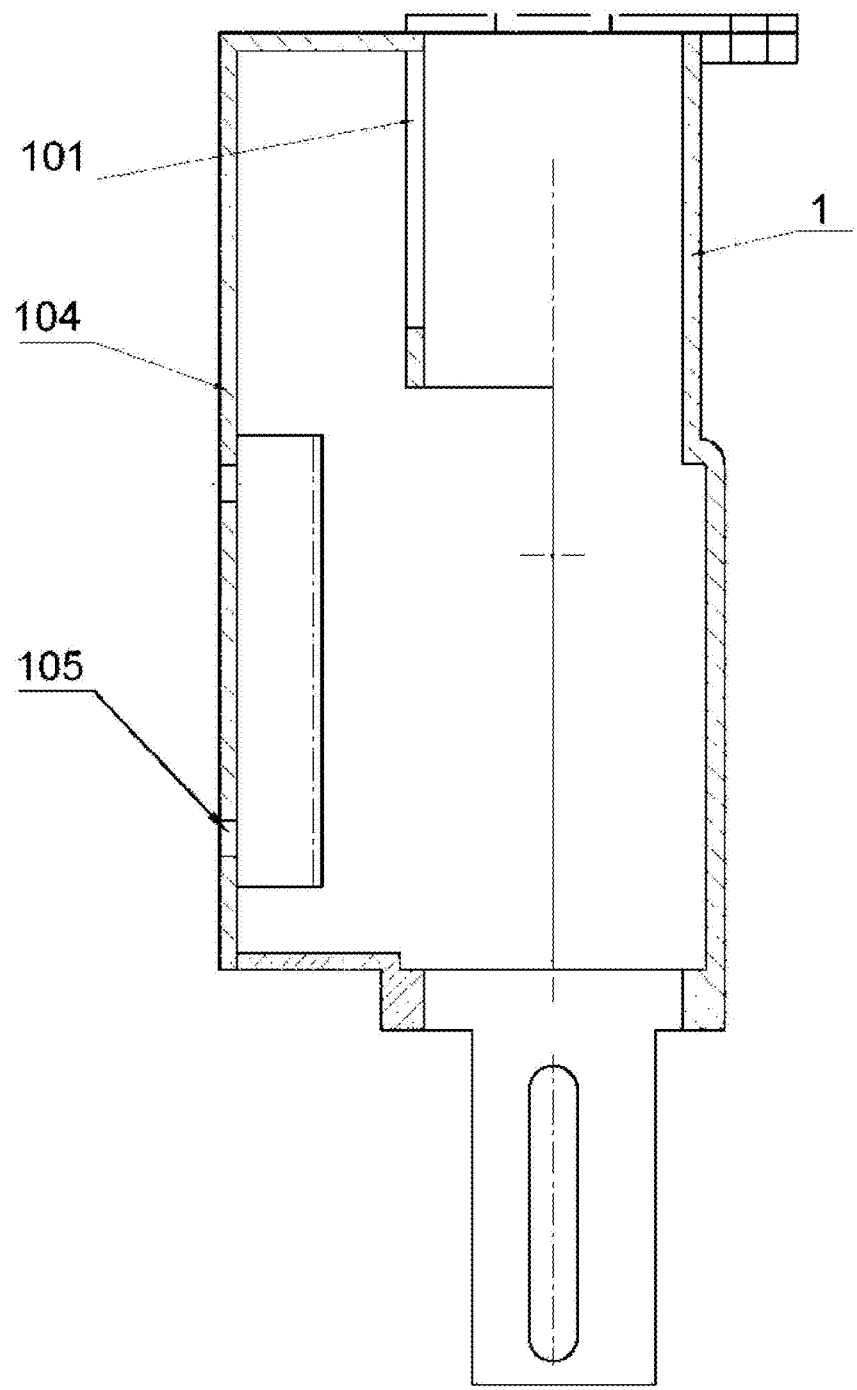
Figure 10:
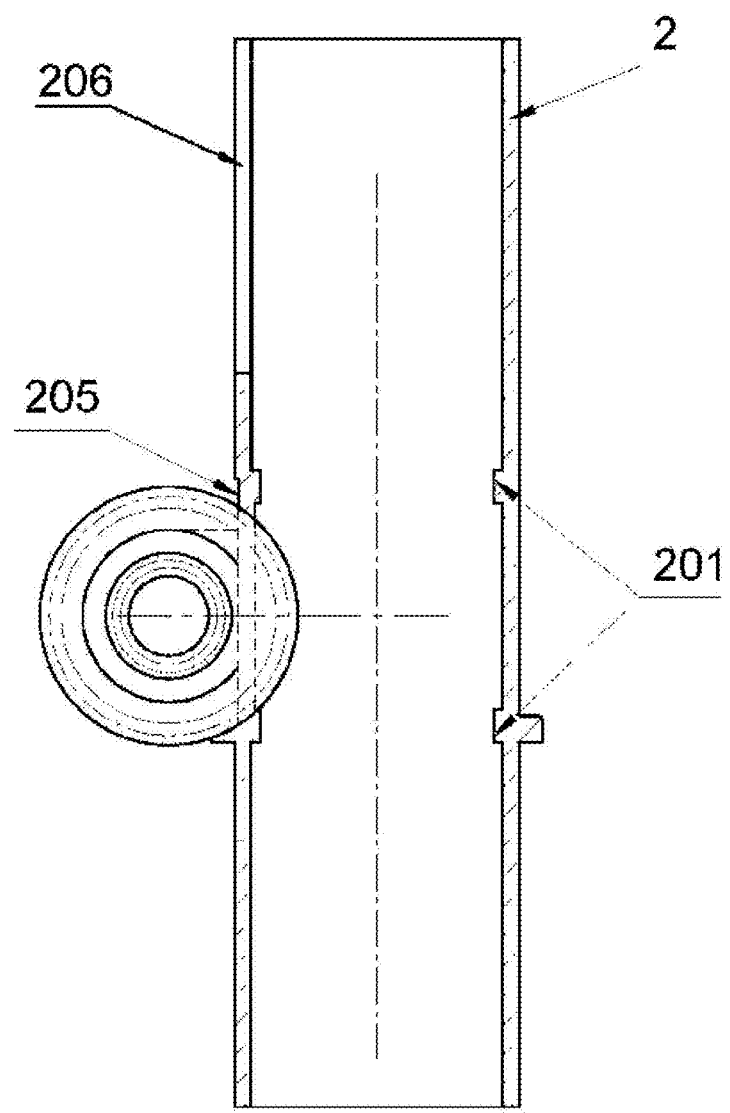
Figure 11:
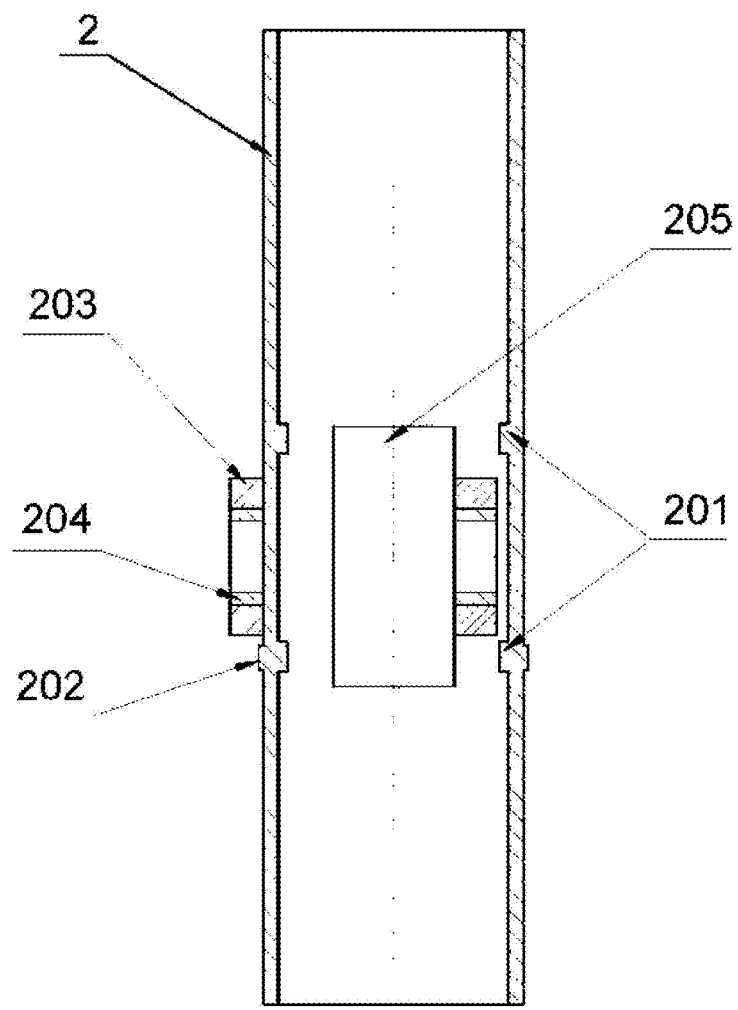
Figure 12:
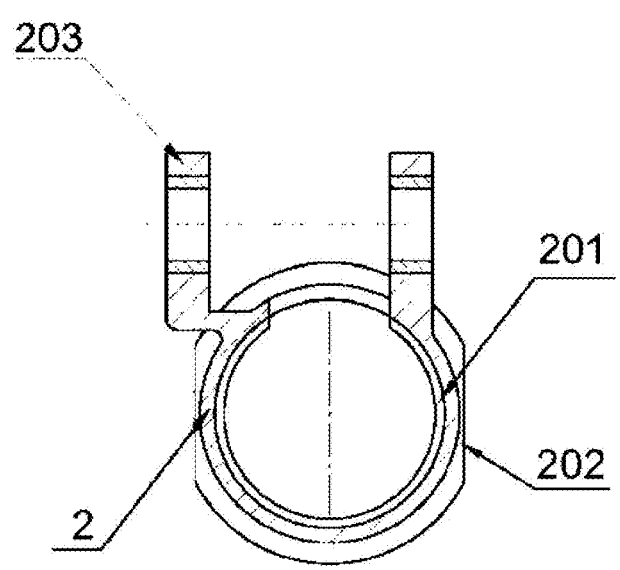
Figure 13:
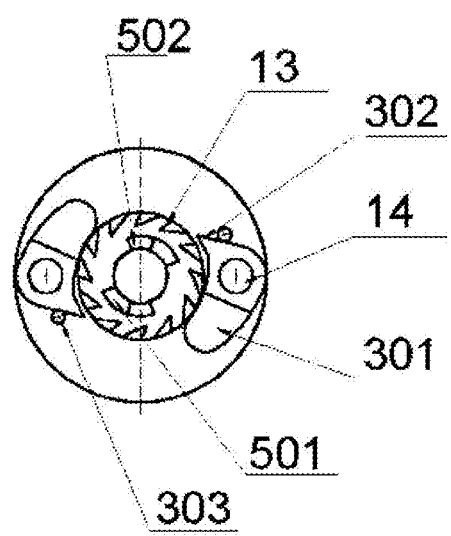
Figure 14:
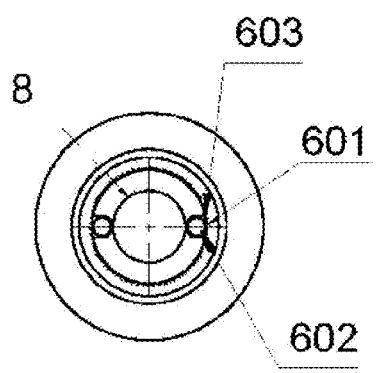

FIG. 1 is a structure diagram of Embodiment 1;
FIG. 2 is a left view of FIG. 1;
FIG. 3 is an A-A view in FIG. 2;
FIG. 4 is a B-B view in FIG. 1;
FIG. 5 is a structure diagram of Embodiment 2;
FIG. 6 is a left view of FIG. 5;
FIG. 7 is a top view of FIG. 6;
FIG. 8 is a C-C view in FIG. 6;
FIG. 9 is a structure diagram of the outer housing;
FIG. 10 is a structure diagram of the inner housing;
FIG. 11 is a left view of FIG. 10;
FIG. 12 is a top view of FIG. 11;
FIG. 13 is a structure diagram of the ratchet wheel pawl & iron interlocks and the internal & outer splines in Embodiment 2;
FIG. 14 is a structure diagram of the emergency locking mechanism.

Where: 1—outer housing, 101—outer housing notch, 102—removable small semicircle tile, 103—fixed large semicircle tile, 104—protecting crust, 105—rack mounting hole, 106—switch anode stator mounting hole, 107—sliding shaft support;
2—inner housing, 201—internal annular protruding shoulder, 202—external annular protruding shoulder, 203—external shaft seat, 204—bearing, 205—rectangular notch; 206—inner housing notch
3—pawl & iron interlock, 301—iron, 302—pawl, 303—bumping post;
4—push rod linkage, 401—rod head, 402—splicing sleeve, 403—retaining shoulder, 404—large hinge pin, 405—torsion spring mounting shaft, 406—middle push rod return torsion spring, 407—open slot, 408—special-shaped snap ring, 409—external annular groove, 410—stop block; 411—small hinge pin, 412—stop pin, 413—internal annular groove, 414—technological notch, 415—U-shaped notch;
5—push rod connecting mechanism, 501—fan-shaped inner spline groove, 502—fan-shaped outer spline key, 503—accommodating hole, 504—locating hole;
6—emergency locking mechanism, 601—circular arc ring groove, 602—steel ball, 603—U-shaped recess;
7—upper push rod, 8—middle push rod, 9—lower push rod, 10—centrifugal disc, 11—worm gear, 12—worm, 13—ratchet wheel, 14—vertical shaft, 15—sliding shaft, 16—slide, 17 return torsion spring, 18—lever connecting fork, 19—rack, 20—switch cathode rotor, 21—accelerator pedal, 22—urgent acceleration judging spring, 24—worm shaft circlip, 25—long and narrow ratchet wheel, 26—switch anode stator, 27—washer.

5. SPECIFIC EMBODIMENT OF THE INVENTION

The following is the detailed description of the present invention in combination with the drawings and the embodiments.

Embodiment 1

According to FIGS. 1, 2, 3, 4, a device for preventing mistakenly stepping on an accelerator by converting acceleration into braking, comprising an accelerator push rod mechanism connected to an accelerator pedal (21) and a current switch making current to a braking actuator, also comprising an outer housing (1) mounted on the outside of the front side plate of the cab, in which a worm gear & worm mechanism composed of a worm (12) and a worm gear (11) is mounted to drive an inner housing (2) that can only move axially; the other end of the worm (12) is mounted in an inner housing through a washer (27) and a worm shaft circlip (24) by axial limiting; the worm gear (11) is mounted on a worm gear shaft through flat keys, and is mounted on the inner housing (2) through a pinion coupled with the worm gear; a rack (19) coordinating with the worm gear (11) through a pinion coupled with the worm gear is fixedly mounted on the outer housing (1); the pinion coupled with the worm gear is a straight toothed spur gear, with a modulus of 1~1.25 m and a tooth number of 17~14 teeth according to the embodiment, the modulus is 1 m, and the tooth number is 17 teeth; the accelerator push rod mechanism comprises an upper push rod (7), a middle push rod (8) and a lower push rod (9); the upper part of the worm (12) is provided with a centrifugal disc (10); a pair of pawl & iron interlocks (3) is hinged to the centrifugal disc (10) through a vertical shaft (14) and a shaft circlip; a return torsion spring (17) is provided between a pawl & iron interlock (3) and the centrifugal disc (10); an axial through hole is arranged at the worm's (12) axis center connected to the centrifugal disc (10); the middle push rod (8) is mounted in the axial through hole by axial limiting with the circlip; the central hole is arranged at the axis center of the middle push rod (8); the outer edge of the middle push rod (8) is provided with a ratchet wheel (13) that can correspondingly coordinate with pawls (302); the upper part of the middle push rod (8) is connected to one end of the upper push rod (7) through a push rod linkage (4); the other end of the upper push rod (7) is connected to the accelerator pedal (21) by radial limiting; the lower part of the middle push rod (8) is connected to the upper part of the lower push rod (9) through the push rod connecting mechanism (5); the lower push rod (9) is connected to a slide (16) integrated with the bottom of the outer housing (1) through a sliding shaft (15) that fixes the bottom of the lower push rod by radial limiting; the sliding shaft's (15) moving up and down in the slide (16) cannot make the lower push rod rotate radially; the lower push rod (9) is also connected to an accelerator cable; the current switch making current to the braking actuator by the middle push rod's (8) rotating is provided between the middle push rod (8) and the outer housing (1); the lower push rod (9) is connected to the lever connecting fork (18) through the sliding shaft (15); the holes in different positions on the lever connecting fork (18) are connected to the engine accelerator through the accelerator connecting rod or the accelerator cable;

According to the present invention, one end of the lever connecting fork (18) is a fork head, and the lower fork edge of the fork head can extend and is provided with a hole for hinging with the accelerator connecting rod or the accelerator cable to increase or decrease the stroke of the accelerator connecting rod or the accelerator cable; the other end is a hub, whose center is an axle hole, and extension bars with different angles to the fork, different lengths and a hinge hole can be provided from the hub to meet the various vehicles' different needs for long or short stroke of the accelerator connecting rod or accelerator cable in a push or pull direction, without need to change the designed strokes of the upper, middle and lower push rods. According to the mounting space and the stroke produced by the accelerator pedal (21), the designed stroke of the upper/middle/push rod should be lengthened as far as possible, so as to obtain the minimum ratio of the operating response stroke of the ratchet wheel & pawl mechanism driven by the worm gear & worm mechanism to the designed stroke of the upper/middle/lower push rod; when emergency braking is required for mistakenly stepping on the accelerator, the accelerator opening increase during the operating response stroke period of the ratchet wheel & pawl mechanism is minimized by changing the position of the hinge hole on the rod of the lever connecting fork (18).

When stepping on the accelerator during normal driving or for overtaking, the stepping force & speed and acceleration cannot trigger jointing of pawls (302) and the ratchet wheel (13), and the downward force on the upper push rod (7) is transferred to the inner housing (2) and the lower push rod (9) through the middle push rod (8) and the worm gear & worm mechanism for going down together, so that the lower push rod (9) drives an accelerator cable downwards to adjust accelerator opening; when mistakenly stepping on the accelerator in an emergency, the stepping force & speed and acceleration make the centrifugal disc (10) connected to the worm (12) rotate at a high speed, triggering the jointing of the pawls (302) and the ratchet wheel (13) so that the middle push rod (8) is driven to rotate, further triggering the push rod connecting mechanism (5) to operate so that the lower push rod (9) first extends into the accommodating hole (503) of the central hole of the middle push rod (8) to release the accelerator, and then triggering the current switch's making current so that the braking actuator executes braking.

According to the present invention, the push rod connecting mechanism (5) comprises a raised inner spline in the lower part of the central hole of the middle push rod (8); the inner spline divides the central hole of the middle push rod (8) into a locating hole (504) for the lower push rod and an ascending return accommodating hole (503) for the lower push rod; the upper part of the lower push rod (9) is mounted in the locating hole (504) and provided with an outer spline that can coordinate with the inner spline; the width of inner spline grooves should be greater than that of outer spline keys, and the greater part is the rotation angle required for the middle push rod (8) to trigger the current switch;

The sunken part of the inner spline is a pair of fan-shaped inner spline grooves (501) that are arranged symmetrically; the raised part of the outer spline is a pair of long and narrow fan-shaped outer spline keys (502);

The push rod linkage (4) comprises a rod head (401) with a U-shaped notch (415) arranged on the upper end and a splicing sleeve (402) arranged on the upper part of the middle push rod (8) for coordinating with the rod head (401); the inner diameter of the splicing sleeve (402) on the middle push rod (8) is greater than the diameter of the central hole, forming a retaining shoulder (403); the bottom of the rod head (401) contacts with the face of the retaining shoulder (403); the lower end of the upper push rod (7) is hinged in the U-shaped notch (415) through a large hinge pin (404), and the upper end of the upper push rod (7) is connected to the accelerator pedal (21) by radial limiting; the bottom of the rod head (401) is provided with a torsion spring mounting shaft (405) coaxial with the rod head (401); the torsion spring mounting shaft (405) is fitted with a middle push rod return torsion spring (406) which prevents falling off through a shaft circlip; one end of the middle push rod return torsion spring (406) is mounted at the bottom of the rod head (401), and the other end is mounted on the wall of the central hole of the middle push rod (8); two open slots (407) are symmetrically arranged on both sides of the splicing sleeve (402); the rod head (401) between the U-shaped notch (415) and the torsion spring mounting shaft (405) is provided with an external annular groove (409) corresponding to the two open slots (407); there is an overlap after the two open slots (407) coordinate with the external annular groove (409); the rod head (401) is connected to the middle push rod (8) at the overlap through a special-shaped snap ring (408); the inner of the external annular groove (409) of the road head (401) is provided with a stop block (410) that enables the middle push rod (8) to achieve a radial stop in conjunction with the special-shaped snap ring (408) under the preload of the middle push rod return torsion spring (406); the stop block (410) in the radial position of the external annular groove (409) of the road head (410) makes the inner spline grooves in the central hole of the middle push rod (8) completely misaligned with the outer spline keys of the lower push rod (9) in a normal state. The other end of the middle push rod return torsion spring (406) is mounted on the wall of the central hole of the middle push rod (8), and a guide slot can be arranged vertically upwards in the inner wall mounting hole position of the center hole of the middle push rod (8).

The current switch comprises a switch anode stator (26), which is insulated from the outer housing (1), and a switch cathode rotor (20), which is arranged on the upper part of the outer edge of the middle push rod (8), can coordinate with the switch anode stator (26) for switching on and is used for making current to the braking actuator; the length of the switch anode stator (26) is greater than the axial stroke of the middle push rod (8); one side of the middle part of the middle push rod clamped by the open slots (407) is provided with two screw holes for mounting the switch cathode rotor (20).

According to the present invention, the pawl & iron interlock (3) is composed of an iron (301) and a pawl (302); the pawl (302) is provided with a mounting hole matched with the vertical shaft (14); the pawl (302) is a 3~8 mm thick V-shaped claw (4 mm thick V-shaped claw in the embodiment); the end far away from the tip of the pawl (302) is the iron (301) unified with the pawl (302); the iron (301) is a half-cut waist-shaped block protruding from the upper plane of the pawl (302); the thickness of the half-cut waist-shaped block is two to three times of the thickness of the pawl (302) (in the embodiment, the thickness of the half-cut waist-shaped block is two times of the thickness of the pawl (302)); the pawl (302) achieves locating through a bumping post (303) on the centrifugal disc (10) in a normal state; the bumping post (303) is used for bumping one end of the pawl (302) and its return torsion spring (17) (in the embodiment, the diameter of the bumping post (303) is 3 mm); the other end of the return torsion spring (17) rests on the protuberant half-cut waist-shaped block.

According to the present invention, the switch anode stator (26) is to arrange two anchor screws on one side of a long and narrow copper sheet; the copper sheet and screws must be insulated from the outer housing (1) except for the side in contact with the switch cathode rotor (20).

According to the present invention, the switch cathode rotor (20) is folded by a copper sheet and has two mounting holes.

A method for preventing mistakenly stepping on an accelerator by converting acceleration into braking makes use of the accelerator pedal (21) stepping force & speed and acceleration to trigger the device for preventing mistakenly stepping on an accelerator by converting acceleration into braking, which comprises an accelerator push rod mechanism connected to an accelerator pedal (21) and a current switch making current to a braking actuator, and also comprises an outer housing (1) in which a worm gear & worm mechanism composed of a worm (12) and a worm gear (11) is mounted to drive an inner housing (2) that can only move axially; the worm (12) is mounted in the inner housing (2) by axial limiting, and the worm gear (11) is mounted on the inner housing (2); a rack (19) coordinating with the worm gear (11) through a pinion coupled with the worm gear is fixedly mounted on the outer housing (1); the accelerator push rod mechanism comprises an upper push rod (7), a middle push rod (8) and a lower push rod (9); the upper part of the worm (12) is provided with a centrifugal disc (10); a pair of pawl & iron interlocks (3) is hinged to the centrifugal disc (10) through a vertical shaft (14) and a shaft circlip; a return torsion spring (17) is provided between a pawl & iron interlock (3) and the centrifugal disc (10); an axial through hole is arranged at the worm's (12) axis center connected to the centrifugal disc (10); the middle push rod (8) is mounted in the axial through hole by axial limiting; the central hole is arranged at the axis center of the middle push rod (8); the outer edge of the middle push rod (8) is provided with a ratchet wheel (13) that can correspondingly coordinate with pawls (302); the upper part of the middle push rod (8) is connected to one end of the upper push rod (7) through a push rod linkage (4); the other end of the upper push rod (7) is connected to the accelerator pedal (21) by radial limiting; the lower part of the middle push rod (8) is connected to the upper part of the lower push rod (9) through the push rod connecting mechanism (5); the lower push rod (9) is connected to a slide (16) integrated with the bottom of the outer housing (1) through a sliding shaft (15) that fixes the bottom of the lower push rod by radial limiting; the lower push rod (9) is also connected to an accelerator cable; the current switch making current to the braking actuator by the middle push rod's (8) rotating is provided between the middle push rod (8) and the outer housing (1); when stepping on the accelerator during normal driving or for overtaking, the stepping force & speed and acceleration cannot trigger jointing of the pawls (302) and the ratchet wheel (13), and the downward force on the upper push rod (7) is transferred to the inner housing (2) and the lower push rod (9) through the middle push rod (8) and the worm gear & worm mechanism for going down together, so that the lower push rod (9) drives an accelerator cable downwards to adjust accelerator opening; when mistakenly stepping on the accelerator in an emergency, the stepping force & speed and acceleration make the centrifugal disc (10) connected to the worm (12) rotate at a high speed, triggering the jointing of the pawls (302) and the ratchet wheel (13) so that the middle push rod (8) is driven to rotate, further triggering the push rod connecting mechanism (5) to operate so that the lower push rod (9) first extends into an accommodating hole (503) of the central hole of the middle push rod (8) to release the accelerator, and then triggering the current switch's making current so that the braking actuator executes braking; in addition, the lower push rod (9) can be connected to lever connecting fork (18) through the sliding shaft (15), and the holes in different positions on the rod of the lever connecting fork (18) can be connected to the engine accelerator through the accelerator connecting rod or the accelerator cable.

According to the embodiment, when a driver steps on accelerator during normal driving or for overtaking, the stepping force & speed and acceleration cannot trigger jointing of pawls (302) and the ratchet (13); the downward force on the upper push rod (7) is transferred to the inner housing (2) and the lower push rod (9) through the middle push rod (8) and the worm gear & worm mechanism for going down together; the pinion coupled with the worm gear on the inner housing (2) engages with the rack (19) on the outer housing (1) for moving downwards to make the worm (12) rotate at a low speed, and simultaneously the downward force on the middle push rod (8) is transferred to the lower push rod (9) for moving downwards and pushing the lever connecting fork (18) to drive the accelerator cable connected to adjust accelerator opening; when mistakenly stepping on the accelerator in an emergency, the stepping force & speed and acceleration make the centrifugal disc (10) connected to the worm (12) rotate at a high speed so as to drive the irons (301) and trigger the jointing of the pawls (302) and the ratchet wheel (13) so that the engagement between the pawls (302) and the ratchet on the middle push rod (8) makes the middle push rod (8) follow it for rotating; after the middle push rod (8) rotates at a certain angle, the long and narrow fan-shaped spline keys on the lower push rod that cannot rotate but can only moves up and down will get through the fan-shaped spline grooves at the lower end of the middle push rod (8) and extends into the accommodating hole (503) in the central hole of the middle push rod (8); the lower push rod (9) is pushed upwards for return by the lever connecting fork (18) under the action of the lever return tension spring to drive the accelerator cable to release the accelerator so as to make the engine return to the idle state; as the angle between the fan-shaped spline grooves is greater than that between the fan-shaped spline keys, the middle push rod (8) can rotate slightly again, and the switch cathode rotor (20) on its upper end will switch on with the switch anode stator (26) fixed and insulated on the outer housing (1) for making current to the braking actuator; other form of current switch closing by an actuating arm and provided on the middle push rod can also be used to make current to the braking actuator through the rotation of the middle push rod (8), thus to brake the vehicle; the braking actuator is an electromagnetic clutch or stepping motor in Invention CN201811378952.1, which makes the negative feedback from the vehicle force applied to the brake for operating or stepping motor drive the brake pedal to brake the vehicle; the stepping motor's driving the brake pedal is to add a pinion to the output shaft of the stepping motor and add a fan-shaped pinion to the hub for the hinge between the braking pedal and the pedal shaft so as to make them engaged; the stepping motor's rotation angle is designed to be the same as the that for the brake pedal to thoroughly brake; the other form of current switch, e.g. stroke switch or push current switch, but the fork edge of the stroke switch should be long and narrow to adapt to the need of the middle push rod (8) to move up and down; when the middle push rod (8) is rotating, the fork on the stroke switch will be pushed to close so as to connect the circuit; when the middle push rod (8) returns, the fork will be driven to disconnect the circuit, so as to realize the conversion of acceleration into braking and thus prevent safety accidents caused by mistakenly stepping on the accelerator; the accelerator pedal (21) is released; as the lower end of the middle push rod (8) is fitted with shaft circlip for axial limiting with the worm (12); under the action of the spring in the same position with the accelerator pedal (21), the device returns to the state that the engine is idle.

The worm gear & worm mechanism rotating ratio, the iron mass and the pawl return torsion spring torque are also used to distinguish the stepping force & speed and acceleration when urgently stepping on the accelerator for overtaking and that when mistakenly stepping on the accelerator for coarse acceleration, and after setting the values of the worm gear & worm mechanism rotating ratio, the iron mass and the pawl return torsion spring torque, adopting the pedal stepping force & speed and acceleration dual triggering mode can ensure that the three working conditions have clear and large intervals which neither overlap nor disturb each other.

Embodiment 2

According to FIGS. 5~14, a device for preventing mistakenly stepping on an accelerator by converting acceleration into braking, comprising an accelerator push rod mechanism connected to an accelerator pedal (21) and a current switch making current to a braking actuator, makes use of the accelerator pedal (21) stepping force & speed and acceleration to trigger the conversion of acceleration into braking, and also comprises an outer housing (1) mounted on the outside of the front side plate of the cab; a worm gear & worm mechanism composed of a worm (12) and a worm gear (11) is mounted in the outer housing (1) to drive an inner housing (2) that can only move axially; the other end of the worm (12) is mounted in the inner housing (2) through the washer (27) and the worm shaft circlip (24) by axial limiting; the worm gear (11) is mounted on the pinion coupled with the worm gear through flat keys; the worm gear (11) is mounted on the inner housing (2) through the pinion coupled with the worm gear; a rack (19) coordinating with the worm gear through a pinion coupled with the worm gear (11) is fixedly mounted on the outer housing (1); the pinion coupled with the worm gear is a straight toothed spur gear, with a modulus of 1~1.25 m and a tooth number of 17~14 teeth (according to the embodiment, the modulus is 1.25 m, and the tooth number is 15 teeth); the accelerator push rod mechanism comprises an upper push rod (7), a middle push rod (8) and a lower push rod (9); the upper part of the worm (12) is provided with a centrifugal disc (10); a pair of pawl & iron interlocks (3) is hinged to the centrifugal disc (10) through a vertical shaft (14) and a shaft circlip; a return torsion spring (17) is provided between a pawl & iron interlock (3) and the centrifugal disc (10); an axial through hole is arranged at the worm's (12) axis center connected to the centrifugal disc (10); the middle push rod (8) is mounted in the axial through hole; an emergency locking mechanism (6) is provided between the axial through hole and the middle push rod (8) to make the middle push rod (8) drive the worm (12) to move; an urgent acceleration judging spring (22) is provided between the outer housing (1) and the lower half of the inner housing (2); the central hole is arranged at the axis center of the middle push rod (8); the outer edge of the middle push rod (8) is provided with a long and narrow ratchet wheel (25) that can correspondingly coordinate with pawls (302) over the full stroke; the upper part of the middle push rod (8) is connected to one end of the upper push rod (7) through a push rod linkage (4); the other end of the upper push rod (7) is connected to the accelerator pedal (21) by radial limiting; the lower part of the middle push rod (8) is connected to the upper part of the lower push rod (9) through the push rod connecting mechanism (5); the lower push rod (9) is connected to a slide (16) integrated with the bottom of the outer housing (1) through a sliding shaft (15) that fixes the bottom of the lower push rod by radial limiting; the sliding shaft's (15) moving up and down in the slide (16) cannot make the lower push rod rotate radially; the lower push rod (9) is also connected to an accelerator cable; the current switch making current to the braking actuator by the middle push rod's (8) rotating is provided between the middle push rod (8) and the outer housing (1); the lower push rod (9) is connected to the lever connecting fork (18) through the sliding shaft (15); the holes in different positions on the lever connecting fork (18) are connected to the engine accelerator through the accelerator connecting rod or the accelerator cable; when stepping on the accelerator during normal driving, the accelerator pedal (21) stepping force & speed and acceleration will not trigger the emergency locking mechanism (6) to operate, and the worm gear & worm mechanism will neither move nor rotate, so that the pawls (302) will not achieve jointing with the long and narrow ratchet wheel (25), and due to the resistance from the urgent acceleration judging spring (22), only the upper push rod (7), the middle push rod (8) and the lower push rod (9) are linked to go down for adjusting the accelerator opening; when stepping on the accelerator during overtaking, there will be two situations according to the accelerator stepping force & speed and acceleration: the first situation—the emergency locking mechanism (6) will still not operate, and the worm gear & worm mechanism will neither move nor rotate, so that the pawls (302) will not achieve jointing with the long and narrow ratchet wheel (25), and only the upper push rod, the middle push rod and the lower push rod are linked to go down for adjusting the accelerator opening; the second situation—the emergency locking mechanism (6) will operate, but the worm gear & worm mechanism will move and rotate at a low or medium speed, unable to trigger the jointing of the pawls (302) and the long and narrow ratchet wheel (25), and the downward force on the upper push rod (7) is transferred to the inner housing (2) and the lower push rod (9) through the middle push rod (8) and the worm gear & worm mechanism for going down together by overcoming the resistance from the urgent acceleration judging spring (22), so as to adjust the accelerator opening; when mistakenly stepping on the accelerator in an emergency, the accelerator pedal (21) stepping force & speed and acceleration trigger the emergency locking mechanism (6) to operate, and the downward force on the upper push rod (7) is transferred to the inner housing (2) through the middle push rod (8) and the worm gear & worm mechanism for going down by overcoming the resistance from the urgent acceleration judging spring (22), so that the centrifugal disc (10) connected to the worm (12) rotates at a high speed, triggering the jointing of the pawls (302) and the long and narrow ratchet wheel (25) to drive the middle push rod (8) to rotate, further triggering the push rod connecting mechanism (5) to operate, so that the lower push rod (9) first extends into an accommodating hole (503) in the central hole of the middle push rod (8) to release the accelerator, and then triggering the current switch's making current so that the braking actuator executes braking. Other form of current switch closing by an actuating arm is provided on the middle push rod.

According to the present invention, the push rod connecting mechanism (5) comprises a raised inner spline in the lower part of the central hole of the middle push rod (8); the inner spline divides the central hole of the middle push rod (8) into a locating hole (504) for the lower push rod and an ascending return accommodating hole (503) for the lower push rod; the upper part of the lower push rod (9) is mounted in the locating hole (504) and provided with an outer spline that can coordinate with the inner spline; the width of inner spline grooves should be greater than that of outer spline keys, and the greater part is the rotation angle required for the middle push rod (8) to trigger the current switch;

The sunken part of the inner spline is a pair of fan-shaped inner spline grooves (501) that are arranged symmetrically; the raised part of the outer spline is a pair of long and narrow fan-shaped outer spline keys (502);

According to the present invention, the push rod linkage (4) comprises a rod head (401) with a U-shaped notch (415) arranged on the upper end and a splicing sleeve (402) arranged on the upper part of the middle push rod (8) for coordinating with the rod head (401); the inner diameter of the splicing sleeve (402) on the middle push rod (8) is greater than the diameter of the central hole, forming a retaining shoulder (403); the bottom of the rod head (401) contacts with the face of the retaining shoulder (403); the lower end of the upper push rod (7) is hinged in the U-shaped notch (415) through a large hinge pin (404), and the upper end of the upper push rod (7) is connected to the accelerator pedal (21) by radial limiting; the bottom of the rod head (401) is provided with a torsion spring mounting shaft (405) coaxial with the rod head (401); the torsion spring mounting shaft (405) is fitted with a middle push rod return torsion spring (406) which prevents falling off through a shaft circlip; one end of the middle push rod return torsion spring (406) is mounted at the bottom of the rod head (401), and the other end is mounted on the wall of the central hole of the middle push rod (8); an internal annular groove (413) is arranged on the inner wall of the splicing sleeve (402); a technological notch (414) connected to the internal annular groove (413) for mounting the rod head (401) is also arranged on the inner wall of the splicing sleeve (402); a through hole parallel to the U-shaped notch (414) is arranged on the rod head (401) between the U-shaped notch (415) and the torsion spring mounting shaft (405); a small hinge pin (411) coordinating with the internal annular groove (413) in the splicing sleeve (402) is mounted in the through hole; the rod head (401) is connected to the middle push rod (8) through the small hinge pin (411); the inner of the internal annular groove (413) of the middle push rod (8) is provided with a stop pin (412) that enables the middle push rod (8) to achieve a radial stop in conjunction with the small hinge pin (411) on the rod head (401) under the preload of the middle push rod return torsion spring (406); the stop pin (412) in the radial position of the internal annular groove (413) of the splicing sleeve (402) of the middle push rod (8) makes the inner spline grooves in the central hole of the middle push rod (8) completely misaligned with the outer spline keys of the lower push rod (9) in a normal state. The other end of the middle push rod return torsion spring (406) is mounted on the wall of the central hole of the middle push rod (8), and a guide slot can be arranged vertically upwards in the inner wall mounting hole position of the center hole of the middle push rod (8).

The setting method of the above stop pin is to drill a hole with a diameter (5 mm in the embodiment) greater than the greater than the internal annular groove (413) height (4.1 mm in the embodiment) on the outer edge of the setting position of the splicing sleeve (402), mount the short cylinder into the hole by interference fit, perform spot welding on the outer edge, and finally process the two end faces of the short cylinder to be consistent with the inner and outer round faces (in this position) of the splicing sleeve (402).

The current switch comprises a switch anode stator (26), which is insulated from the outer housing (1), and a switch cathode rotor (20), which is arranged on the upper part of the outer edge of the middle push rod (8), can coordinate with the switch anode stator (26) for switching on and is used for making current to the braking actuator; the length of the switch anode stator (26) is greater than the axial stroke of the middle push rod (8); the outer edge of the splicing sleeve (402) on the middle push rod (8) is provided with two screw holes for mounting the switch cathode rotor (20).

According to the present invention, for recognition of normally stepping on the accelerator, urgently stepping on the accelerator for overtaking and mistakenly stepping on the accelerator, the emergency locking mechanism (6) comprises circular arc ring grooves (601) arranged uniformly on the wall of the axial through hole of the worm (12) along the axial direction and U-shaped recesses (603) arranged uniformly in the middle part of the outer edge of the middle push rod (8) along the radial direction for coordinating with the circular arc ring grooves (601), and vertical U shapes are under oblique U shapes on the U-shaped recesses (603) In which steel balls (602) are mounted. In the embodiment, there are 18 circular arc ring grooves (601) with a depth of 0.4 mm; the radius of the circular arc parts of the circular arc ring grooves (601) is consistent with that of the steel balls (602); the spacing between two circular arc ring grooves (601) is 0.3 mm.

According to the present invention, the upper part of the outer housing (1) is a whole-circle pipe; the upper part of the whole-circle pipe is provided with an outer housing notch (101) required for not hindering the full-stroke movement and rotation of the switch cathode rotor (20) on the middle push rod (8); the middle part of the outer housing is a semicircle pipe; the radius of the lower part of the semicircle pipe is consistent with the radius (in the full length direction) of the semicircle pipe of the outer housing (1) according to Embodiment 1, and the difference is that the radius of the lower part greater than is that of the upper part of the semicircle pipe for mounting the urgent acceleration judging spring (22); the lower end of the semicircle pipe is provided with a fixed large semicircle tile (103); the opposite side of the fixed large semicircle tile (103) is provided with a removable small semicircle tile (102); the inner diameter of the fixed large semicircle tile (103) and that of the removable small semicircle tile (102) are the same as that of the whole-circle pipe; the outer diameter of the fixed large semicircle tile (103) and that of the removable small semicircle tile (102) are the same as that of the semicircle pipe in the middle part; when mounting the inner housing (2), two external shaft seats (203) for mounting the worm gear (11) on the inner housing (2) should be able to get through the small semicircle notch opposite to the large semicircle tile; there are two symmetric sliding shaft supports (107) in the lower part of the large semicircular tile; vertical slides (16) are provided on the sliding shaft supports (107), and the sliding shaft can ensure that the lower push road is unable to rotate and the axial movement is smooth; one side of the whole-circle pipe and the semicircle pipe is provided with a protecting crust (104) from both sides of the semicircle body; two rack (19) mounting holes (105) are arranged on the wall of the protecting crust (104) of the semicircle pipe; two switch anode stator mounting holes (106) are arranged on the crust wall on one side of the protecting crust (104) opposite to the rotation direction of the switch cathode rotor (20); the above removable small semicircle tile (102) is provided with a protective iron sheet; mounting lugs are arranged on both sides of the fixed large semicircle tile (103) and the removable small semicircle tile (102); the whole-circle pipe and the protecting crust (104) are provided with the outer housing mounting lugs.

The inner housing (2) is a circular pipe body; the middle section of the inner wall of the circular pipe body is provided with two internal annular protruding shoulders (201) for axial limiting of the worm (12); the middle section of the outer edge of the circular pipe body is provided with an external annular protruding shoulder (202) with a radius inconsistent with the full-length radius of the inner housing (2) in Embodiment 1 but with a difference that it is used for mounting the urgent acceleration judging spring (22), and both sides of the middle section of the outer edge of the circular pipe body are provided with two external shaft seats (203) for mounting the worm gear (11); bearings (204) are mounted in the external shaft seats (203); the pipe body between two external shaft seats (203) is provided with a rectangular notch (205) required for the engaging of the worm gear (11) and the worm (12); the upper part of the circular pipe body is provided with an inner housing notch (206) required for not hindering the rotation of the switch cathode rotor (20) on the middle push rod (8). The method for mounting the inner housing (2) and the urgent acceleration judging spring (22): The inner housing (2) is loaded in the outer housing (1) from the small semicircle notch in the lower part of the outer housing (1) and then pushed to the uppermost position; the urgent acceleration judging spring (22) is compressed by a special tool and then loaded from the semicircle notch, and the protecting cover on the top of the outer housing presses the inner housing to the normal position.

A method for preventing mistakenly stepping on an accelerator by converting acceleration into braking makes use of the accelerator pedal (21) stepping force & speed and acceleration to trigger the device for preventing mistakenly stepping on an accelerator by converting acceleration into braking, which comprises an accelerator push rod mechanism connected to an accelerator pedal (21) and a current switch making current to a braking actuator, and also comprises an outer housing (1) in which a worm gear & worm mechanism composed of a worm (12) and a worm gear (11) is mounted to drive an inner housing (2) that can only move axially; the worm (12) is mounted in the inner housing (2) by axial limiting, and the worm gear (11) is mounted on the inner housing (2); a rack (19) coordinating with the worm gear (11) through a pinion coupled with the worm gear is fixedly mounted on the outer housing (1); the accelerator push rod mechanism comprises an upper push rod (7), a middle push rod (8) and a lower push rod (9); the upper part of the worm (12) is provided with a centrifugal disc (10); a pair of pawl & iron interlocks (3) is hinged to the centrifugal disc (10) through a vertical shaft (14) and a shaft circlip; a return torsion spring (17) is provided between a pawl & iron interlock (3) and the centrifugal disc (10); an axial through hole is arranged at the worm's (12) axis center connected to the centrifugal disc (10); the middle push rod (8) is mounted in the axial through hole; an emergency locking mechanism (6) that makes the middle push rod (8) drive the worm (12) to move is provided between the axial through hole and the middle push rod (8); an urgent acceleration judging spring (22) is provided between the outer housing (1) and the lower half of the inner housing (2); the central hole is arranged at the axis center of the middle push rod (8); the outer edge of the middle push rod (8) is provided with a long and narrow ratchet wheel (25) that can correspondingly coordinate with pawls (302) over the full stroke; the upper part of the middle push rod (8) is connected to one end of the upper push rod (7) through a push rod linkage (4); the other end of the upper push rod (7) is connected to the accelerator pedal (21) by radial limiting; the lower part of the middle push rod (8) is connected to the upper part of the lower push rod (9) through the push rod connecting mechanism (5); the lower push rod (9) is connected to a slide (16) integrated with the bottom of the outer housing (1) through a sliding shaft (15) that fixes the bottom of the lower push rod by radial limiting; the sliding shaft's (15) moving up and down in the slide (16) cannot make the lower push rod rotate radially; the lower push rod (9) is also connected to an accelerator cable; the current switch making current to the braking actuator by the middle push rod's rotating is provided between the middle push rod (8) and the outer housing (1); the lower push rod (9) is connected to the lever connecting fork (18) through the sliding shaft (15); the holes in different positions on the lever connecting fork (18) are connected to the engine accelerator through the accelerator connecting rod or the accelerator cable; when stepping on the accelerator during normal driving, the accelerator pedal (21) stepping force & speed and acceleration will not trigger the emergency locking mechanism (6) to operate, and the worm gear & worm mechanism will neither move nor rotate, so that the pawls (302) will not achieve jointing with the long and narrow ratchet wheel (25), and due to the resistance from the urgent acceleration judging spring (22), only the upper push rod (7), the middle push rod (8) and the lower push rod (9) are linked to go down for adjusting the accelerator opening; when stepping on the accelerator during overtaking, there will be two situations according to the accelerator stepping force & speed and acceleration: the first situation—the emergency locking mechanism (6) will still not operate, and the worm gear & worm mechanism will neither move nor rotate so that the pawls (302) will not achieve jointing with the long and narrow ratchet wheel (25), and only the upper push rod, the middle push rod and the lower push rod are linked to go down for adjusting the accelerator opening; the second situation—the emergency locking mechanism (6) will operate, but the worm gear & worm mechanism will move and rotate at a low or medium speed, unable to trigger the jointing of the pawls (302) and the long and narrow ratchet wheel (25), and the downward force on the upper push rod (7) is transferred to the inner housing (2) and the lower push rod (9) through the middle push rod (8) and the worm gear & worm mechanism for going down together by overcoming the resistance from the urgent acceleration judging spring (22), so as to adjust the accelerator opening; when mistakenly stepping on the accelerator in an emergency, the accelerator pedal (21) stepping force & speed and acceleration trigger the emergency locking mechanism (6) to operate, and the downward force on the upper push rod (7) is transferred to the inner housing (2) through the middle push rod (8) and the worm gear & worm mechanism for going down by overcoming the resistance from the urgent acceleration judging spring (22), so that the centrifugal disc (10) connected to the worm (12) rotates at a high speed, triggering the jointing of the pawls (302) and the long and narrow ratchet wheel (25) to drive the middle push rod (8) to rotate, further triggering the push rod connecting mechanism (5) to operate, so that the lower push rod (9) first extends into an accommodating hole (503) in the central hole of the middle push rod (8) to release the accelerator, and then triggering the current switch's making current so that the braking actuator executes braking.

According to the present invention, the urgent acceleration judging spring (22) is used to distinguish the stepping force & speed and acceleration when stepping on the accelerator during normal driving and that when stepping on the accelerator for overtaking; the urgent acceleration judging spring force, the worm gear & worm mechanism rotating ratio, the iron mass (301) and the pawl return torsion spring (17) torque are also used to distinguish the stepping force & speed and acceleration when urgently stepping on the accelerator for overtaking and that when mistakenly stepping on the accelerator for coarse acceleration, and after setting the urgent acceleration judging spring force (22), the worm gear & worm mechanism rotating ratio, the iron mass (301) and the pawl return torsion spring torque, adopting the pedal stepping force & speed and acceleration dual triggering mode can ensure that the three working conditions have clear and large intervals which neither overlap nor disturb each other.

In the embodiment, the elasticity of the urgent acceleration judging spring (22) is 80~160 N, not only being able to overcome the friction on the worm (12) from the middle push rod (8) but also overcome the gravity of the inner housing (2) and the worm gear & worm mechanism on the inner housing so as to ensure no downward moving during acceleration for normal driving, but also being able to avoid too much resistance on the foot when the emergency locking mechanism 6 operates due to acceleration for overtaking;

In the embodiment, the accelerator pedal stepping force to make the pawls operate is greater than 300 N, and the acceleration (a) is higher than 30 m/S2.

The embodiment adopts the pedal stepping force & speed and acceleration dual triggering mode, to meet the need for recognition of normally stepping on the accelerator, urgently stepping on the accelerator for overtaking and mistakenly stepping on the accelerator. When a driver normally steps on accelerator during driving, due to the low downward force on the upper push rod (7), both speed and acceleration are not high, and the emergency locking mechanism (6) does not operate; the low downward is not transferred to the worm (12) but only transferred to the lower push rod (9); as the resistance of the urgent acceleration judging spring (22) results in that neither the worm gear & worm mechanism nor the inner housing (2) move, the upper push rod (7), the middle push rod (8) and the lower push rod (9) are linked to go down and push the lever connecting fork (18) to drive the accelerator cable connected to it for adjusting the accelerator opening. When urgently steeping on accelerator for overtaking, in some operation circumstances that the accelerator pedal (21) stepping force & speed and acceleration are within the upper limit ranges for normally stepping on the accelerator, neither the worm gear & worm mechanism nor the inner housing (2) move, and the upper, middle and lower push rods are linked to go down to adjusting the accelerator opening by the accelerator cable; in some operation circumstances that the downward speed and acceleration of the middle push rod is higher than the gravitational acceleration (9.8 m/S2) of the falling steel balls (602) on the middle push rod (8), the middle push rod (8) locks the worm (12) through the steel balls (602); the emergency locking mechanism (6) operates, which makes the inner housing (2) and the worm gear & worm mechanism following the middle push rod (8) to go down together so as to drive the centrifugal disc (10) to rotate, but the resistance from the urgent acceleration judging spring (22) makes the driver's mind to exert a force on the accelerator pedal (21) according to the foot's feeling during urgent acceleration for overtaking during normal driving, and the force is far from the degree that the steeping force & speed and acceleration to make the inner housing (2) and the worm gear (11) on it can trigger the pawls on the worm (12) to operate, middle push rod does not rotate, so that the upper push rod (7), the middle push rod (8), the worm gear & worm mechanism and the inner housing (2) go down together to push the lower push rod (9) to drive the lever connecting fork (18) to adjust the accelerator opening by the accelerator cable. When fiercely stepping on the accelerator pedal (21) in an emergency, the middle push rod (8) locks the worm (12) through the steel balls (602); the emergency locking mechanism (6) operates; the middle push rod (8) pushes the worm gear (11) to rapidly go down through the worm (12) and the inner housing (2); the centrifugal disc (10) on the worm (12) rotates at a high speed so as to drive the irons (301) and trigger the jointing of the pawls (302) and the long and narrow ratchet wheel (25); the pawls (302) engages with the ratchets on the middle push rod (8) so as to make the middle push rod (8) following the worm (12) to rotate; after the middle push rod (8) rotates at a certain angle, the long and narrow fan-shaped spline keys (502) on the lower push rod (9) that cannot rotate but can only moves up and down will get through the fan-shaped spline grooves (501) at the lower end of the middle push rod (8) and extends into the accommodating hole (503) in the central hole of the middle push rod (8); the lower push rod (9) is pushed upwards for return by the lever connecting fork (18) under the action of the lever return tension spring to drive the accelerator cable to release the accelerator so as to make the engine return to the idle state; as the angle between the fan-shaped spline grooves is greater than that between the fan-shaped spline keys, the middle push rod (8) can rotate slightly again, and the switch cathode rotor (20) on its upper end will switch on with the switch anode stator (26) fixed and insulated on the outer housing (1) for making current to the braking actuator; other form of current switch closing by an actuating arm and provided on the middle push rod can also be used to make current to the braking actuator through the rotation of the middle push rod (8) so as to brake the vehicle; the braking actuator is an electromagnetic clutch or stepping motor in Invention CN201811378952.1, which makes the negative feedback from the vehicle force applied to the brake for operating or stepping motor drive the brake pedal to brake the vehicle; the stepping motor's driving the brake pedal is to add a pinion to the output shaft of the stepping motor and add a fan-shaped pinion to the hub for the hinge between the braking pedal and the pedal shaft so as to make them engaged; the stepping motor's rotation angle is designed to be the same as the that for the brake pedal to thoroughly brake; the other form of current switch, e.g. stroke switch or push current switch, but the fork edge of the stroke switch should be long and narrow to adapt to the need of the middle push rod (8) to move up and down; when the middle push rod (8) is rotating, the fork on the stroke switch will be pushed to close so as to connect the circuit; when the middle push rod (8) returns, the fork will be driven to disconnect the circuit, so as to realize the conversion of acceleration into braking and thus prevent safety accidents caused by mistakenly stepping on the accelerator; the accelerator pedal (21) is released; the upper push rod (7) and the middle push rod (8) return under the action of the accelerator pedal (21) return ring; the inner housing (2) and the worm gear & worm mechanism return through upward pushing by the urgent acceleration judging spring (22), and the lower push rod (9) is driven back to the state that the engine is idle by the return tension spring of the lever connecting fork (18).

When the device is mounted obliquely, the two steel balls (602) should be placed in the left and right oblique positions rather than the front and back positions, so as not to affect the falling speed of the steel balls (602).

The protecting cover on the top of the outer housing (1) is provided with corrugated rubber hose for dust prevention.

The rest are the same as Embodiment 1.

What is claimed is:

1. A device for preventing mistakenly stepping on an accelerator by converting acceleration into braking, comprising an accelerator push rod mechanism connected to an accelerator pedal wherein the device further comprises an outer housing in which a worm gear and worm mechanism composed of a worm and a worm gear is mounted to drive an inner housing that can only move axially; and the worm gear is mounted on the inner housing; the accelerator pedal push rod mechanism comprises an upper push rod, a middle push rod and a lower push rod; an upper part of the worm is provided with a centrifugal disc; a pair of pawl and iron interlocks is hinged to the centrifugal disc through a vertical shaft; a return torsion spring is provided between a pawl and iron interlock and the centrifugal disc; an outer edge of the middle push rod is provided with a ratchet wheel that can correspondingly coordinate with pawls; an upper part of the middle push rod is connected to one end of the upper push rod through a push rod linkage; a lower part of the middle push rod is connected to an upper part of the lower push rod through a push rod connecting mechanism; the lower push rod is connected to a slide integrated with a bottom of the outer housing;

when stepping on the accelerator pedal during normal driving or for overtaking, the stepping force and speed and acceleration cannot trigger jointing of the pawls and the ratchet wheel, and a downward force on the upper push rod is transferred to the inner housing and the lower push rod through the middle push rod and the worm gear and worm mechanism for going down together, when mistakenly stepping on the accelerator pedal in an emergency, the stepping force and speed and acceleration make the centrifugal disc connected to the worm rotate.

2. The device for preventing mistakenly stepping on an accelerator by converting acceleration into braking of claim 1, wherein the push rod linkage comprises a rod head with a U-shaped notch arranged on the upper end and a splicing sleeve arranged on the upper part of the middle push rod for coordinating with the rod head; forming a retaining shoulder; the bottom of the rod head contacts with a face of the retaining shoulder; the lower end of the upper push rod is hinged in the U-shaped notch through a large hinge pin, the bottom of the rod head is provided with a torsion spring mounting shaft coaxial with the rod head; the torsion spring mounting shaft is fitted with a middle push rod return torsion spring;

one end of the middle push rod return torsion spring is mounted at the bottom of the rod head, two open slots are symmetrically arranged on both sides of the splicing sleeve; the rod head between the U-shaped notch and the torsion spring mounting shaft is provided with an external annular groove corresponding to the two open slots; there is an overlap after the two open slots coordinate with the external annular groove; the rod head is connected to the middle push rod at the overlap through a special-shaped snap ring; the inner of the external annular groove of the rod head is provided with a stop block that enables the middle push rod to achieve a radial stop in conjunction with the special-shaped snap ring under the preload of the middle push rod return torsion spring;

a current switch comprises a switch anode stator, which is insulated from the outer housing, and a switch cathode rotor, which is arranged on the upper part of an outer edge of the middle push rod, the length of the switch anode stator is greater than an axial stroke of the middle push rod.

3. The device for preventing mistakenly stepping on an accelerator by converting acceleration into braking of claim 1 or 2, wherein the pawl and iron interlock is composed of a pawl; the pawl is provided with a mounting hole matched with the vertical shaft; the pawl is a 3-8 mm thick V-shaped claw; an end far away from a tip of the pawl is an iron unified with the pawl, and the iron is a half-cut waist-shaped block protruding from an upper plane of the pawl.

4. A method for preventing mistakenly stepping on an accelerator by converting acceleration into braking makes use of an accelerator pedal stepping force and speed and acceleration to trigger a device for preventing mistakenly stepping on an accelerator by converting acceleration into braking, which comprises an accelerator push rod mechanism connected to an accelerator pedal, characterized in: a device for preventing mistakenly stepping on an accelerator by converting acceleration into braking also comprises an outer housing in which a worm gear and worm mechanism composed of a worm and a worm gear is mounted to drive an inner housing that can only move axially; and the worm gear is mounted on the inner housing; the accelerator pedal push rod mechanism comprises an upper push rod, a middle push rod and a lower push rod; an upper part of the worm is provided with a centrifugal disc;

a pair of pawl and iron interlocks is hinged to the centrifugal disc through a vertical shaft; a return torsion spring is provided between a pawl and iron interlock and the centrifugal disc;

an outer edge of the middle push rod is provided with a ratchet wheel that can correspondingly coordinate with pawls; an upper part of the middle push rod is connected to one end of the upper push rod through a push rod linkage; a lower part of the middle push rod is connected to an upper part of the lower push rod through a push rod connecting mechanism; the lower push rod is connected to a slide integrated with a bottom of the outer housing; when stepping on the accelerator pedal during normal driving or for overtaking, and a downward force on the upper push rod is transferred to the inner housing and the lower push rod through the middle push rod and the worm gear and worm mechanism for going down together, when mistakenly stepping on the accelerator pedal in an emergency, the stepping force and speed and acceleration make the centrifugal disc connected to the worm rotate.

5. A device for preventing mistakenly stepping on an accelerator by converting acceleration into braking comprises an accelerator push rod mechanism connected to an accelerator pedal makes use of an accelerator pedal stepping force and speed and acceleration to trigger the conversion of acceleration into braking, characterized in that it also comprises an outer housing in which a worm gear and worm mechanism composed of a worm and a worm gear is mounted to drive an inner housing that can only move axially; and the worm gear is mounted on the inner housing; the accelerator pedal push rod mechanism comprises an upper push rod, a middle push rod and a lower push rod; an upper part of the worm is provided with a centrifugal disc; a pair of pawl and iron interlocks is hinged to the centrifugal disc through a vertical shaft; a return torsion spring is provided between a pawl and iron interlock and the centrifugal disc; an emergency locking mechanism, which makes the middle push rod to drive the worm to move, an urgent acceleration judging spring is provided between the outer housing and a lower part of the inner housing; an outer edge of the middle push rod is provided with a long and narrow ratchet wheel that can correspondingly coordinate with pawls over the full stroke; an upper part of the middle push rod is connected to one end of the upper push rod through a push rod linkage; a lower part of the middle push rod is connected to an upper part of the lower push rod through a push rod connecting mechanism;

the lower push rod is connected to a slide integrated with a bottom of the outer housing;

when stepping on the accelerator pedal during normal driving, the accelerator pedal stepping force and speed and acceleration will not trigger the emergency locking mechanism to operate, and due to the resistance from the urgent acceleration judging spring, only the upper push rod, when stepping on the accelerator pedal during overtaking, there will be two situations according to the accelerator pedal stepping force and speed and acceleration: the first situation—the emergency locking mechanism will still not operate, the second situation—the emergency locking mechanism will operate, but the worm gear and worm mechanism will move and rotate and a downward force on the upper push rod is transferred to the inner housing and the lower push rod through the middle push rod and the worm gear and worm mechanism for going down together by overcoming the resistance from the urgent acceleration judging spring, when mistakenly stepping on the accelerator pedal in an emergency, the accelerator pedal stepping force and speed and acceleration trigger the emergency locking mechanism to operate, and a downward force on the upper push rod is transferred to the inner housing through the middle push rod and the worm gear and worm mechanism for going down by overcoming the resistance from the urgent acceleration judging spring, so that the centrifugal disc connected to the worm rotates.

6. The device for preventing mistakenly stepping on an accelerator by converting acceleration into braking of claim 5, wherein the push rod linkage comprises a rod head with a U-shaped notch arranged on the upper end and a splicing sleeve arranged on the upper part of the middle push rod for coordinating with the rod head; forming a retaining shoulder; the bottom of the rod head contacts with a face of the retaining shoulder; the lower end of the upper push rod is hinged in the U-shaped notch through a large hinge pin, the bottom of the rod head is provided with a torsion spring mounting shaft coaxial with the rod head; the torsion spring mounting shaft is fitted with a middle push rod return torsion spring;

one end of the middle push rod return torsion spring is mounted at the bottom of the rod head, an internal annular groove is arranged on an inner wall of the splicing sleeve, and a technological notch connected to the internal annular groove for mounting the rod head is also arranged on an inner wall of the splicing sleeve; a through hole parallel to the U-shaped notch is arranged on the rod head between the U-shaped notch and the torsion spring mounting shaft; a small hinge pin coordinating with the internal annular groove in the splicing sleeve is mounted in the through hole; the rod head is connected to the middle push rod through the small hinge pin; the inner of the internal annular groove of the middle push rod is provided with a stop pin that enables the middle push rod to achieve a radial stop in conjunction with the small hinge pin on the rod head under the preload of the middle push rod return torsion spring;

a current switch comprises a switch anode stator, which is insulated from the outer housing, and a switch cathode rotor, which is arranged on the upper part of an outer edge of the middle push rod, the length of the switch anode stator is greater than an axial stroke of the middle push rod.

7. The device for preventing mistakenly stepping on an accelerator by converting acceleration into braking of claim 5 or 6, wherein U-shaped recesses arranged uniformly in the middle part of an outer edge of the middle push rod along the radial direction for coordinating with the circular arc ring grooves, and vertical U shapes are under oblique U shapes on the U-shaped recesses in which steel balls are mounted;

the pawl and iron interlock is composed of a pawl; the pawl is provided with a mounting hole matched with the vertical shaft; the pawl is a 3-8 mm thick V-shaped claw; an end far away from a tip of the pawl is an iron unified with the pawl, and the iron is a half-cut waist-shaped block protruding from an upper plane of the pawl.

8. The device for preventing mistakenly stepping on an accelerator by converting acceleration into braking of claim 7, wherein an opposite side of the fixed large semicircle tile is provided with a removable small semicircle tile, and the inner diameter of the fixed large semicircle tile and there are two symmetric sliding shaft supports in a lower part of the large semicircular tile; vertical slides are provided on the sliding shaft supports;

and two switch anode stator mounting holes are arranged on a crust wall on one side of a protecting crust opposite to the rotation direction of the switch cathode rotor;

the inner housing is a circular pipe body; a middle section of an inner wall of the circular pipe body is provided with two internal annular protruding shoulders for axial limiting of the worm; a middle section of an outer edge of the circular pipe body is provided with an external annular protruding shoulder for mounting the urgent acceleration judging spring, and both sides of a middle section of an outer edge of the circular pipe body are provided with two external shaft seats for mounting the worm gear; bearings are mounted in the external shaft seats; the circular pipe body between the two external shaft seats is provided with a rectangular notch required for the engaging of the worm gear and the worm; an upper part of the circular pipe body is provided with an inner housing notch required for not hindering a full-stroke movement and rotation of the switch cathode rotor on the middle push rod.

9. A method for preventing mistakenly stepping on an accelerator by converting acceleration into braking makes use of an accelerator pedal stepping force and speed and acceleration to trigger a device for preventing mistakenly stepping on an accelerator by converting acceleration into braking, which comprises an accelerator push rod mechanism connected to an accelerator pedal, characterized in: a device for preventing mistakenly stepping on an accelerator by converting acceleration into braking also comprises an outer housing in which a worm gear and worm mechanism composed of a worm and a worm gear is mounted to drive an inner housing that can only move axially; the accelerator pedal push rod mechanism comprises an upper push rod, a middle push rod and a lower push rod; an upper part of the worm is provided with a centrifugal disc; a pair of pawl and iron interlocks is hinged to the centrifugal disc through a vertical shaft; a return torsion spring is provided between a pawl and iron interlock and the centrifugal disc; an emergency locking mechanism, which makes the middle push rod to drive the worm to move, and the middle push rod; an urgent acceleration judging spring is provided between the outer housing and a lower part of the inner housing; an outer edge of the middle push rod is provided with a long and narrow ratchet wheel that can correspondingly coordinate with pawls over the full stroke; an upper part of the middle push rod is connected to one end of the upper push rod through a push rod linkage; a lower part of the middle push rod is connected to an upper part of the lower push rod through a push rod connecting mechanism; the lower push rod is connected to a slide integrated with a bottom of the outer housing; when stepping on the accelerator pedal during normal driving, the accelerator pedal stepping force and speed and acceleration will not trigger the emergency locking mechanism to operate, and the worm gear and worm mechanism will neither move nor rotate, and due to the resistance from the urgent acceleration judging spring, only the upper push rod, when stepping on the accelerator pedal during overtaking, there will be two situations according to the accelerator pedal stepping force and speed and acceleration: the first situation—the emergency locking mechanism will still not operate, and the worm gear and worm mechanism will neither move nor rotate, the second situation—the emergency locking mechanism will operate, but the worm gear and worm mechanism will move and rotate and a downward force on the upper push rod is transferred to the inner housing and the lower push rod through the middle push rod and the worm gear and worm mechanism for going down together by overcoming the resistance from the urgent acceleration judging spring, the accelerator pedal stepping force and speed and acceleration trigger the emergency locking mechanism to operate, and a downward force on the upper push rod is transferred to the inner housing through the middle push rod and the worm gear and worm mechanism for going down by overcoming the resistance from the urgent acceleration judging spring, so that the centrifugal disc connected to the worm rotates.

10. The method for preventing mistakenly stepping on an accelerator by converting acceleration into braking of claim 9, wherein the urgent acceleration judging spring is used to distinguish the stepping force and speed and acceleration when stepping on the accelerator pedal during normal driving and that when stepping on the accelerator pedal for overtaking; an urgent acceleration judging spring force, a worm gear and worm mechanism rotating ratio, an iron mass and a pawl return torsion spring torque are also used to distinguish the stepping force and speed and acceleration when urgently stepping on the accelerator pedal for overtaking and that when mistakenly stepping on the accelerator pedal for coarse acceleration, and after setting the urgent acceleration judging spring force, the worm gear and worm mechanism rotating ratio, the iron mass and the pawl return torsion spring torque, adopting a pedal stepping force and speed and acceleration dual triggering mode can ensure that three working conditions have clear and large intervals which neither overlap nor disturb each other.

* * * * *